United States Patent
Zhao et al.

(10) Patent No.: US 11,545,741 B2
(45) Date of Patent: Jan. 3, 2023

(54) MULTIPLE FEED SLOT ANTENNA

(71) Applicant: Motorola Mobility LLC, Chicago, IL (US)

(72) Inventors: Junsheng Zhao, Vernon Hills, IL (US); Eric Le Roy Krenz, Crystal Lake, IL (US); Hugh Smith, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/335,585

(22) Filed: Jun. 1, 2021

(65) Prior Publication Data

US 2021/0288399 A1 Sep. 16, 2021

Related U.S. Application Data

(62) Division of application No. 16/353,218, filed on Mar. 14, 2019, now Pat. No. 11,239,546.

(51) Int. Cl.
  *H01Q 1/38* (2006.01)
  *G06F 1/16* (2006.01)
  (Continued)

(52) U.S. Cl.
  CPC ............ *H01Q 1/38* (2013.01); *G06F 1/1698* (2013.01); *H01Q 1/243* (2013.01); *H01Q 21/0043* (2013.01)

(58) Field of Classification Search
  CPC ...... H01Q 1/38; H01Q 1/243; H01Q 21/0043; H01Q 21/064; H01Q 13/18; G06F 1/1698
  See application file for complete search history.

(56) References Cited

U.S. PATENT DOCUMENTS

| 4,245,222 A | 1/1981 | Eng et al. |
| 4,590,478 A | 5/1986 | Powers et al. |

(Continued)

FOREIGN PATENT DOCUMENTS

| CN | 109066054 | 12/2018 |
| CN | 109088160 | 12/2018 |

(Continued)

OTHER PUBLICATIONS

Rajesh et al., "A Wideband, Dual-Polarized, Substrate-Integrated Cavity-Backed Slot Antenna", IEEE Antennas and Wireless Propagation Letters, vol. 9, 2010, pp. 645-648 (Year: 2010).*

(Continued)

*Primary Examiner* — Daniel D Chang
(74) *Attorney, Agent, or Firm* — FIG. 1 Patents

(57) ABSTRACT

Multiple feed, front-shielded, coplanar waveguide, direct-fed, cavity-backed slot antennas are described. Various implementations form an antenna unit capable of millimeter waveform and/or microwave waveform transmissions. An antenna comprises a conductive plate that includes an aperture. The aperture has a shape that extends along an axis that bisects the aperture into first and second bisected portions, the first bisected portion having a first geometry type, and the second portion having a second geometry type that is a bilateral symmetry shape type of the first geometry type. In implementations, the aperture is configured to radiate waveforms within a frequency range from about between 600 Megahertz (MHz) to 72 Gigahertz (GHz) by applying multiple signal feeds to the conductive plate.

20 Claims, 18 Drawing Sheets

(51) Int. Cl.
*H01Q 1/24* (2006.01)
*H01Q 21/00* (2006.01)

(56) References Cited

U.S. PATENT DOCUMENTS

| | | | |
|---|---|---|---|
| 5,517,203 | A | 5/1996 | Fiedziuszko |
| 5,581,266 | A | 12/1996 | Peng et al. |
| 6,518,932 | B1 | 2/2003 | Matsui et al. |
| 6,903,700 | B2 | 6/2005 | Maruhashi et al. |
| 11,121,472 | B2 | 9/2021 | Zhao et al. |
| 11,239,546 | B2 | 2/2022 | Zhao et al. |
| 2005/0104793 | A1 | 5/2005 | Yuanzhu |
| 2006/0284778 | A1 | 12/2006 | Sanford et al. |
| 2013/0135159 | A1* | 5/2013 | Goebel ............... H01Q 13/106 343/703 |
| 2013/0194146 | A1 | 8/2013 | Lee et al. |
| 2016/0204514 | A1 | 7/2016 | Miraftab et al. |
| 2020/0161735 | A1 | 5/2020 | Kamo et al. |
| 2020/0295447 | A1 | 9/2020 | Zhao et al. |
| 2020/0295465 | A1 | 9/2020 | Zhao et al. |

FOREIGN PATENT DOCUMENTS

| | | |
|---|---|---|
| JP | S63181505 | 7/1988 |
| JP | H09289414 | 11/1997 |
| JP | H11186837 | 7/1999 |
| JP | 2007088882 | 4/2007 |

OTHER PUBLICATIONS

Ragini et al., "Miniaturized W Slot Ultra Wide Band Microstrip Antenna for Short Distance Communication", International Conference on Electronics, Communication and Aerospace Technology ICECA 2017 (Year: 2017).*
"Corrected Notice of Allowability", U.S. Appl. No. 16/353,218, dated Apr. 28, 2021, 2 pages.
"Corrected Notice of Allowability", U.S. Appl. No. 16/353,218, dated May 17, 2021, 2 pages.
"Corrected Notice of Allowability", U.S. Appl. No. 16/353,117, dated Jun. 9, 2021, 2 pages.
"Corrected Notice of Allowability", U.S. Appl. No. 16/353,117, dated Aug. 18, 2021, 2 pages.
"Final Office Action", U.S. Appl. No. 16/353,117, dated Feb. 1, 2021, 10 pages.
"Final Office Action", U.S. Appl. No. 16/353,218, dated Feb. 26, 2021, 14 pages.
"International Search Report and Written Opinion", PCT Application No. PCT/US2019/064425, dated Jun. 12, 2020, 23 pages.
"International Search Report and Written Opinion", PCT Application No. PCT/US/2019/064407, dated May 27, 2020, 25 pages.
"Invitation to Pay Fees and Partial International Search Report", Application No. PCT/US2019/064407, dated Mar. 11, 2020, 12 pages.
"Invitation to Pay Fees and Partial International Search Report", Application No. PCT/US2019/064425, dated Mar. 4, 2020, 13 pages.
"Non-Final Office Action", U.S. Appl. No. 16/353,218, dated Jun. 18, 2021, 7 pages.
"Non-Final Office Action", U.S. Appl. No. 16/353,117, dated Jul. 27, 2020, 7 pages.
"Non-Final Office Action", U.S. Appl. No. 16/353,218, dated Jul. 29, 2020, 9 pages.
"Notice of Allowance", U.S. Appl. No. 16/353,117, dated Jun. 21, 2021, 5 pages.
"Notice of Allowance", U.S. Appl. No. 16/353,117, dated Apr. 14, 2021, 7 pages.
"Notice of Allowance", U.S. Appl. No. 16/353,218, dated Apr. 16, 2021, 7 pages.
"Restriction Requirement", U.S. Appl. No. 16/353,117, dated Jun. 18, 2020, 6 pages.
"Restriction Requirement", U.S. Appl. No. 16/353,218, dated Jul. 9, 2020, 6 pages.
Comite, Davide et al., "Hybrid waveguide/coaxial feeder for dual-pol Fabry-Perot cavity antennas radiating omnidirectional TM/TE waves", Oct. 2017, 3 pages.
Kobayashi, Kiroaki et al., "Slot-Array Antennas Fed by Coplanar Waveguide for Millimeter-Wave Radiation", IEEE Transactions on Microwave Theory and Techniques, vol. 46, No. 6, Jun. 1998, pp. 800-805.
Li, Mingjian et al., "Low-Cost Wideband Microstrip Antenna Array for 60-GHz Applications", IEEE Transactions on Antennas and Propagation, vol. 62, No. 6, Jun. 2014, pp. 3012-3018.
Lu, Xian-Long et al., "A Dual-Polarized Cross-Slot Antenna Array on a Parallel-Plate Waveguide With Compact Structure and High Efficiency", IEEE Antennas and Wireless Propagation Letters, vol. 17, No. 1, Jan. 2018, pp. 8-11.
Lukic, Milan et al., "Surface-Micromachined Dual Ka-Band Cavity Backed Patch Antenna", IEEE Transactions on Antennas and Propagation, vol. 55, No. 7, Jul. 2007, pp. 2107-2110.
McKnight, James W., "A Cavity-backed Coplanar Waveguide Slot Antenna Array", Graduate Theses and Dissertaion, Oct. 14, 2009, 109 pages.
Mishra, Ragini et al., "Miniaturized W slot ultra wide band microstrip antenna for short distance communication", Apr. 2017, 2 pages.
Ohira, Masataka, "60-GHz Wideband Substrate-Integrated-Waveguide Slot Array Using Closely Spaced Elements for Planar Multisector Antenna", IEEE Transactions on Antennas and Propagation, vol. 58, No. 3, Mar. 2010, pp. 993-998.
Pan, Bo, "Development of micromachined millimeter-wave modules for next-generation wireless transceiver front-ends", Georgia Tech Theses and Dissertations, Aug. 2008, 162 pages.
Paryani, Rajesh C. et al., "A Wideband, Dual-Polarized, Substrate-Integrated Cavity-Backed Slot Antenna", Jul. 2010, 3 pages.
Qu, Shi-Wei, "Broadband Millimeter-Wave Short Backfire Antenna With Bowtie Exciter", IEEE Antennas and Wireless Propagation Letters, vol. 11, Jul. 2012, pp. 850-853.
Ravindra, Prashant et al., "A Compact Multiband Proximity Coupled Rectangular Microstrip Antenna with Multiple CSRR for Wireless Applications", International Journal of Advances in Microwave Technology (IJAMT), vol. 1, No. 3, Nov. 2016, pp. 74-79.
Seong, Nak-Seon et al., "A Microstrip-Fed Cavity-Backed Circularly Polarized Horn Antenna", Microwave and Optical Technology Leters, vol. 48, No. 12, Dec. 2006, pp. 2454-2456.
Wu, Ke et al., "Substrate-Integrated Millimeter-Wave and Terahertz Antenna Technology", Jul. 2012, pp. 2219-2232.
Zhu, Jianfeng et al., "60 GHz Wideband High-Gain Circularly Polarized Antenna Array With Substrate Integrated Cavity Excitation", IEEE Antennas and Wireless Propagation Letters, vol. 17, No. 5, May 2018, pp. 751-755.
"Corrected Notice of Allowability", U.S. Appl. No. 16/353,218, dated Jan. 7, 2022, 2 pages.
"Final Office Action", U.S. Appl. No. 16/353,218, dated Sep. 16, 2021, 8 pages.
"International Preliminary Report on Patentability", Application No. PCT/US19/64425, dated Sep. 23, 2021, 17 pages.
"International Preliminary Report on Patentability", PCT Application No. PCT/US19/64407, dated Sep. 23, 2021, 20 pages.
"Notice of Allowance", U.S. Appl. No. 16/353,218, dated Oct. 6, 2021, 5 pages.
U.S. Appl. No. 17/335,528, "Non-Final Office Action", U.S. Appl. No. 17/335,528, dated May 24, 2022, 9 pages.
Chen, Zhuozhu, et al., "A Compact Cavity-Backed Endfire Slot Antenna", IEEE Antennas and Wireless Propagation Letters, vol. 13 [retrieved Jun. 3, 2022]. Retrieved from the Internet <https://doi.org/10.1109/LAWP.2014.2304731>, Feb. 5, 2014, 4 pages.
U.S. Appl. No. 17/335,528, "Notice of Allowance", U.S. Appl. No. 17/335,528, dated Sep. 23, 2022, 8 pages.

* cited by examiner

MULTIPLE FEED SLOT ANTENNA

RELATED APPLICATION

This application is a divisional of and claims priority to U.S. patent application Ser. No. 16/353,218 filed Mar. 14, 2019 entitled "Multiple Feed Slot Antenna," the disclosure of which is incorporated by reference herein in its entirety.

BACKGROUND

The evolution of wireless communications puts increased demand on the devices that include the corresponding wireless functionality. For example, increased transmission frequencies translate into smaller wavelengths. These smaller wavelengths pose challenges to the electronic circuitry associated with the transceiver paths, such as size, accuracy, interference, shielding, etc. To further compound these challenges, devices that support wireless communications oftentimes have constrained space in which to incorporate the supporting hardware, thus imposing additional restrictions on how the devices implement these features.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
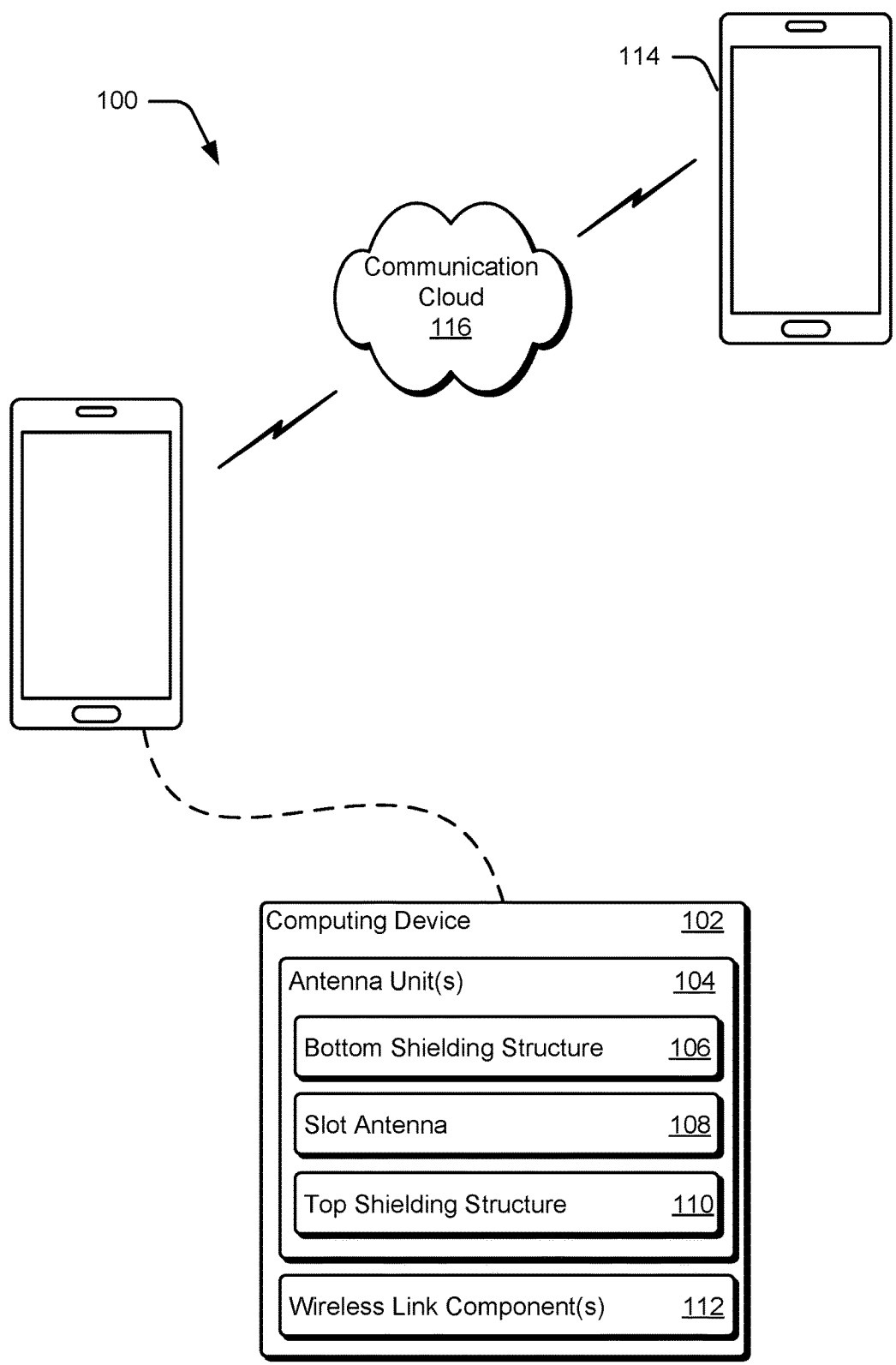
FIG. 1 is an overview of a representative environment in which front-shielded, coplanar waveguide, direct-fed, cavity-backed slot antenna can be employed in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Techniques described herein provide front-shielded, coplanar waveguide, direct-fed, cavity-backed slot antennas. Various implementations form an antenna unit capable of electromagnetic waveform transmissions, such as microwave or millimeter electromagnetic waveforms. Generally, the microwave or millimeter electromagnetic waveforms reside within a frequency range from about between 600 Megahertz (MHz) to 72 Gigahertz (GHz). The phrase "about between" signifies that the frequency range can include real-world frequency deviations from the ideal and/or exact values, where the frequency deviations are still operable to maintain successful wireless communications. A bottom shielding structure of the antenna unit defines a cavity, where various implementations include one or more non-radiating dampening structures within the cavity. Some implementations include a slot antenna within the cavity defined by the bottom shielding structure, such as a coplanar waveguide (CPW) direct-fed slot antenna, to form a cavity-backed slot antenna. Some implementations connect a top shielding structure to the bottom shielding structure to encase the slot antenna. In one or more implementations, the top shielding structure includes aperture windows to allow electromagnetic waveform transmissions, such as microwave or millimeter electromagnetic waveforms, radiated by the slot antenna to radiate outward from the antenna unit.

Some implementations provide multiple feed slot antenna by forming an aperture in a metal plate, where the aperture has a shape that extends along at least one axis. The axis bisects the aperture into two portions such that the first bisected portion has a first geometry type, and the second bisected portion has a second geometry type that is a bilateral symmetry shape type associated with the first geometry type. In various implementations, the aperture is configured to radiate electromagnetic waveform transmissions, such as microwave or millimeter electromagnetic waveforms, using multiple signal feeds.

Consider now an example environment in which various aspects as described herein can be employed.

Example Environment

FIG. 1 illustrates an example environment 100 that includes an example computing device 102 in the form of a mobile phone. Here, computing device 102 includes wireless communication capabilities that facilitate a bi-directional link between various computing devices through wireless network(s), such as a wireless local area network (WLAN), a wireless telecommunication network, a wireless (Wi-Fi) access point, and so forth. Various implementations of computing device 102 support millimeter-wave and/or microwave communication exchanges associated with 5$^{th}$ Generation Wireless Systems (5G). In implementations, the microwave or millimeter electromagnetic waveforms reside within a frequency range from about between 600 Megahertz (MHz) to 72 Gigahertz (GHz). The phrase "about between" signifies that the frequency range can include real-world frequency deviations from the ideal and/or exact values, where the frequency deviations are still operable to maintain successful wireless communications. For example, a waveform that radiates at 599.999 MHz that is operable to maintain successful wireless communications within a communication system is considered to be "about between" the frequency range of 600 MHz to 72 GHz.

Computing device 102 includes one or more antenna unit(s) 104, where each respective antenna unit corresponds to a front-shielded, coplanar waveguide, direct-fed, cavity-backed slot antenna unit. While described in the context of a coplanar waveguide slot antenna, it is to be appreciated that other types of slot antenna and/or antenna feed mechanisms can be utilized without departing from the scope of the claimed subject matter.

Generally, a slot antenna refers to a conductive structure including, by way of example and not of limitation, a metal structure, such as a flat metal plate, that includes an aperture, hole, and/or slot. Applying a source signal to the metal structure causes the aperture to radiate electromagnetic waveforms, thus implementing an antenna. The size, shape, and/or depth of the aperture within the metal plate generally corresponds to a desired resonant frequency of the resultant antenna.

Slot antenna can alternately or additionally be modified to alter the associated radiation pattern. For example, in general terms, a cavity-backed slot antenna includes a cavity that is devoid of electronic circuitry behind the metal plate of the slot antenna. This generates a unidirectional radiation pattern from the slot antenna.

As an alternate or additional modification, various slot antenna utilize a coplanar waveguide to feed the cavity-backed slot antenna for propagating high frequency signals, such as those associated with millimeter wavelengths and/or microwave wavelengths. Accordingly, a coplanar waveguide, direct-fed, cavity-backed slot antenna refers to a slot antenna that includes a cavity at the back of the slot antenna and has a coplanar waveguide as the signal feed. Various implementations utilize a single port signal feed, while alternate or additional implementations utilize multiple port signal feeds.

In various implementations, antenna units 104 encase a coplanar waveguide, direct-fed, cavity-backed slot antenna in a shielded structure by overlaying a front shielding structure on top of the bottom shielding structure and slot antenna to form an antenna unit. The antenna unit forms a closed shielding unit with shielding surrounding the unit, with the exception of shielding at a location corresponding to an opening and/or aperture included in the top shielding structure. Various implementations position the aperture of the top shielding over the radiating portions of the slot antenna to allow the radiating signals to exit the antenna unit at a desired location and provide shielding in the areas surrounding the top shielding structure's aperture. This allows the antenna unit to be mounted to a device at non-traditional locations since the shielding prevents the radiating signals from leaking into undesired locations, such as areas with electronic circuitry.

Computing device 102 can include a single antenna unit and/or multiple antenna units. In some scenarios, computing device 102 positions the multiple antenna units in varying locations to create a particular radiation pattern. As one example, a first antenna unit can be positioned at the back of a computing device, a second antenna unit can be positioned at the front of the computing device, a third antenna unit can be positioned on a left side of the computing device, and so forth. As another example, the multiple antenna units can form an antenna array as further described herein. In one or more implementations, each respective antenna unit includes a bottom shielding structure 106, a slot antenna 108, and a top shielding structure 110.

Bottom shielding structure 106 represents a housing structure that forms and/or defines a cavity that is devoid of electronic circuitry. For example, in some implementations, the shape of bottom shielding structure 106 corresponds to an open 3-dimensional (3D) rectangular box that has a flat rectangular plate on the bottom and extending sides that collectively form a cavity within the rectangular box. Bottom shielding structure 106 can be formed out of any suitable type of material, such as a copper alloy, steel, aluminum, copper, tin, etc. In some implementations, the material selected for the bottom shielding structure can be based upon characteristics of adjacent circuitry, the desired electromagnetic radiations patterns and/or frequencies to shield, cost, etc. As one example, a steel metal has properties that shield low frequencies better relative copper alloys. Conversely, copper alloys have properties that shield higher frequencies better relative to steel. Thus, for high-frequency shielding, various implementations form bottom shielding structure using copper alloys. In alternate or additional implementations, the bottom shielding structure is formed from steel to shield low frequency signals. The thickness, size, and shape of the bottom shielding structure can alternately or additionally be based characteristics of the desired electromagnetic radiations patterns and/or frequencies to shield. As one example, the thickness and shape of the structure can form a cavity with a predetermined size, shape, and/or volume that achieve a desired performance factor (e.g., transmission bandwidth, resonant frequency, etc.). In some implementations, bottom shielding structure 106 includes dampening structures to suppress, eliminate, and/or shift lossy resonance, such as 3D rectangular slabs as further described herein.

Slot antenna 108 represents a slot antenna placed on top of and/or within the cavity of bottom shielding structure 106. In one or more implementations, the slot antenna 108 is formed using a flat, conductive metal plate that includes one or more apertures, slots, and/or holes. The number, size, and/or shape of the aperture(s) formed in the flat metal plate can be based upon any suitable characteristic, such as desired resonant frequency and/or desired resonant frequency range of the corresponding slot antenna. As a simplified example, various implementations include a rectangular slot within the metal plate, where the slot has a length corresponding to a desired resonant frequency and a width corresponding to a desired bandwidth. However, other shapes can be utilized as well, such as annular slots, annular slots with coplanar waveguide feeds, rectangular ring slots, tapered slots, etc. Thus, slot antenna 108 represents any suitable configuration of a slot antenna. Various implementations layer dielectric material between slot antenna 108 and bottom shielding structure 106 to add support to the antenna unit.

Top shielding structure 110 represents a top shielding layer that connects and/or seals to the bottom shielding structure 106 effective to provide signal shielding from the signals radiated by the slot antenna internal to the antenna unit. In various implementations, top shielding structure 110 includes an aperture, hole, and/or slot that partially opens the closed structure to allow the radiating waveforms to propagate outward from the antenna unit through the opening. Accordingly, the aperture can be positioned over radiating portions of slot antenna 108 to control where signals exit the antenna unit and where the antenna unit provides shielding. Similar to the bottom shielding structure, various implementations layer a dielectric between the slot antenna 108 and the top shielding structure.

Computing device 102 also includes one or more wireless link component(s) 112 that generally represent any combination of hardware, firmware, and/or software components used to maintain a wireless link (e.g., protocol stacks, signal generation, signal routing, signal demodulation, signal modulation, etc.). For example, wireless link components 112 can include any combination of protocol stacks, transceiver paths, modulators, demodulators, an analog-to-digital converter (ADC), a digital-to-analog converter (DAC), and so forth. Wireless link components 112 electronically and/or magnetically couple to antenna units 104 to enable computing device 102 to communicate with other devices wirelessly, such as with computing device 114 over communication cloud 116.

Communication cloud 116 generally represents any suitable type of communication network that facilitates a bi-directional link between various computing devices. This can include cell phone networks, WLANs, sensor networks, satellite communication networks terrestrial microwave networks, and so forth. Accordingly, communication cloud 116 can include multiple interconnected communication networks that comprise a plurality of interconnected elements, examples of which are provided herein. In this example, communication cloud 116 enables computing device 102 to communicate with computing device 114, where computing device 114 generally represents any type of device capable of facilitating wireless communications, such as a server, a desktop computing device, a base station, a cellular mobile phone, a smart watch, etc.

Having described an example operating environment in which aspects of various implementations as described herein can be utilized, consider now a general discussion on front-shielded, coplanar waveguide, direct-fed, cavity-backed slot antenna in accordance with one or more implementations.

Front-shielded CPW Direct-Fed Cavity-Backed Slot Antenna

The resources of existing wireless communication systems become strained as more and more devices include wireless communication capabilities. For example, as more devices share a same frequency band, the shared frequency band can become oversaturated. To remedy this strain, various communication systems, such as 5G communication systems, are expanding into higher frequency spectrums. These higher frequency bands not only pose challenges to successful signal transmission and reception, but they can adversely affect hardware as well, such as by making the electronics less energy efficient, putting a high demand on signal processing capabilities, introducing more phase noise, impacting a device's form factor, and so forth. As one example, a computing device's form factor can be negatively impacted through the addition of a telescopic antenna that supports these higher frequencies but adds size and protrusions to the device. When a computing device has a fixed size in which to incorporate the various types of hardware, this can cause a competition for space between the components. Accordingly, a tradeoff exists between including new functionality and the corresponding space utilized to implement that functionality.

To illustrate, consider a computing device that includes various types of electronics using a printed circuit board (PCB). Without proper isolation from the circuitry included in the PCB, radio frequency signal feeds can incur degradation to a point where the signal no longer functions successfully. Therefore, the positioning of an antenna array and/or radio frequency (RF) signal feeds relative to a PCB can include a setback or clearance to maintain a predetermined level of isolation, where the setback and/or clearance is void of electronics. As one example, coaxial cable can be utilized to deliver the independent signal feeds to each respective antenna of an antenna array with the inclusion of a setback. However, the frequency of the RF feed can drive the use of larger setbacks relative to frequencies in maintain a signal with the same quality. In other words, higher frequency rates increase the size of a setback relative to other frequencies in order to maintain a working signal. In turn, these setbacks consume more space and leave less space for other electronics.

Techniques described herein provide front-shielded, coplanar waveguide, direct-fed, cavity-backed slot antennas. Various implementations form an antenna unit capable of millimeter waveform and/or microwave waveform transmissions using multiple layers. A bottom shielding structure forms a first layer, where the bottom shielding structure includes a bottom surface and side surfaces that extend away from the bottom surface to form and/or define a cavity. Some implementations include lossy resonance dampening structures within the cavity that dampen, eliminate, or shift resonance frequencies. A second layer includes a slot antenna, such as a coplanar waveguide, direct-fed, slot antenna located within the cavity to form a cavity-backed slot antenna. Some implementations encase the slot antenna by connecting and/or sealing the edges of a top shielding structure to the bottom shielding structure. Various implementations include aperture windows in the top shielding structure to allow millimeter waveforms and/or microwave waveforms radiated by the slot antenna to radiate outward from the antenna unit Consider now FIG. 2 that illustrates an example of a front-shielded, coplanar waveguide, direct-fed, cavity backed slot antenna in accordance with one or more implementations. In various scenarios, the example described with respect to FIG. 2 can be considered a continuation of one or more examples described with respect to FIG. 1.

Figure 2:
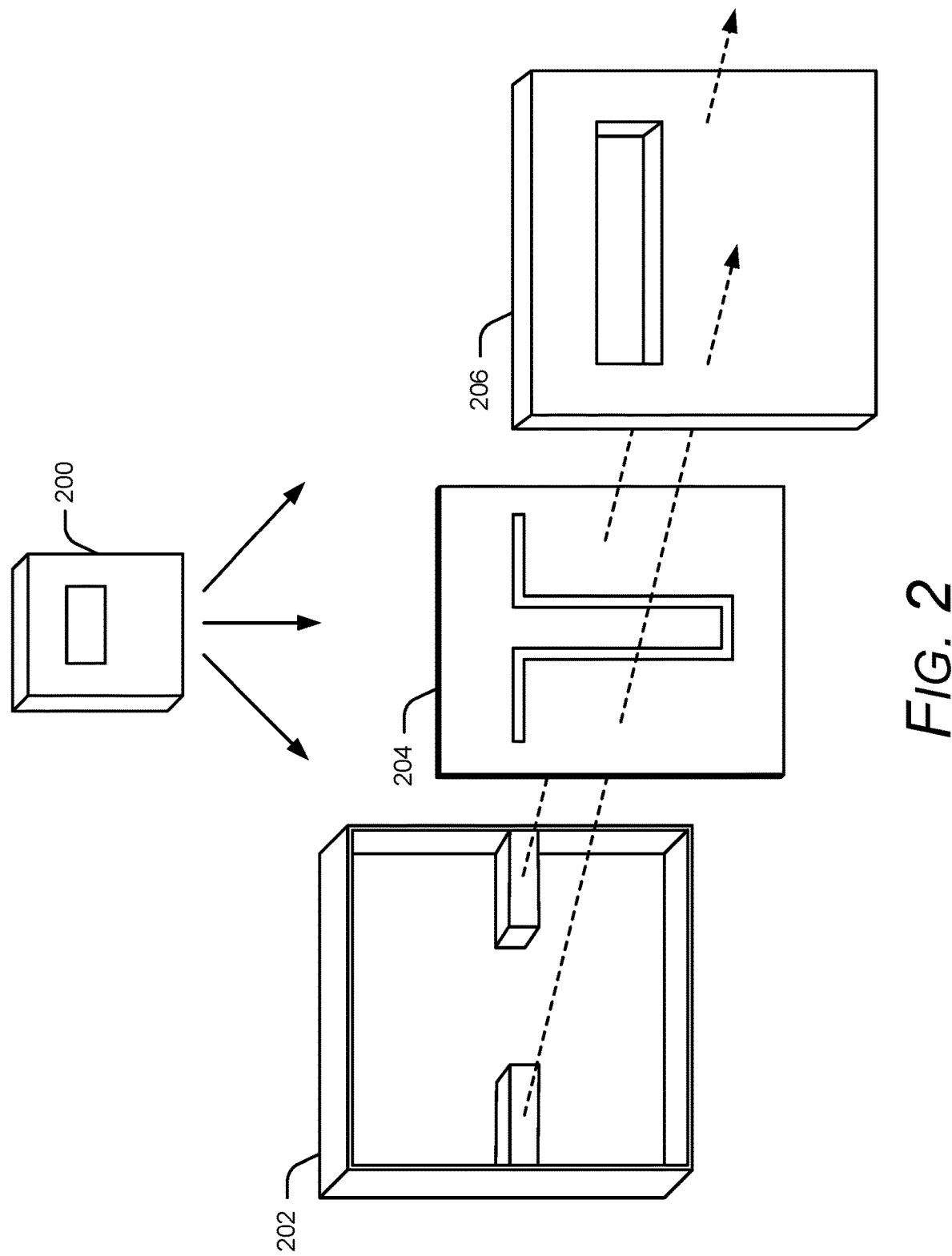
FIG. 2 illustrates an example antenna unit in accordance with one or more implementations.

The upper portion of FIG. 2 includes antenna unit 200 that is representative of a front-shielded, coplanar waveguide, direct-fed, cavity backed slot antenna. In one or more implementations, antenna unit 200 is representative of one or more antenna units 104 of FIG. 1. In one or more implementations, antenna unit 200 radiates electromagnetic waveform transmissions, such as microwave or millimeter electromagnetic waveforms, associated with a communication system, but it is to be appreciated that the antenna unit can be configured to radiate alternate or additional waveforms of varying length and/or frequency without departing from the scope of the claimed subject matter. In the lower portion of FIG. 2, antenna unit 200 has been fragmented and expanded to illustrate the various layers the antenna unit includes: a bottom shielding structure 202 that forms a cavity, a slot antenna 204, and a top shielding structure 206. Collectively, these components form a front-shielded, coplanar waveguide, direct-fed, cavity backed slot antenna as further described in FIGS. 3, 4, and 5, respectively.

Figure 3:
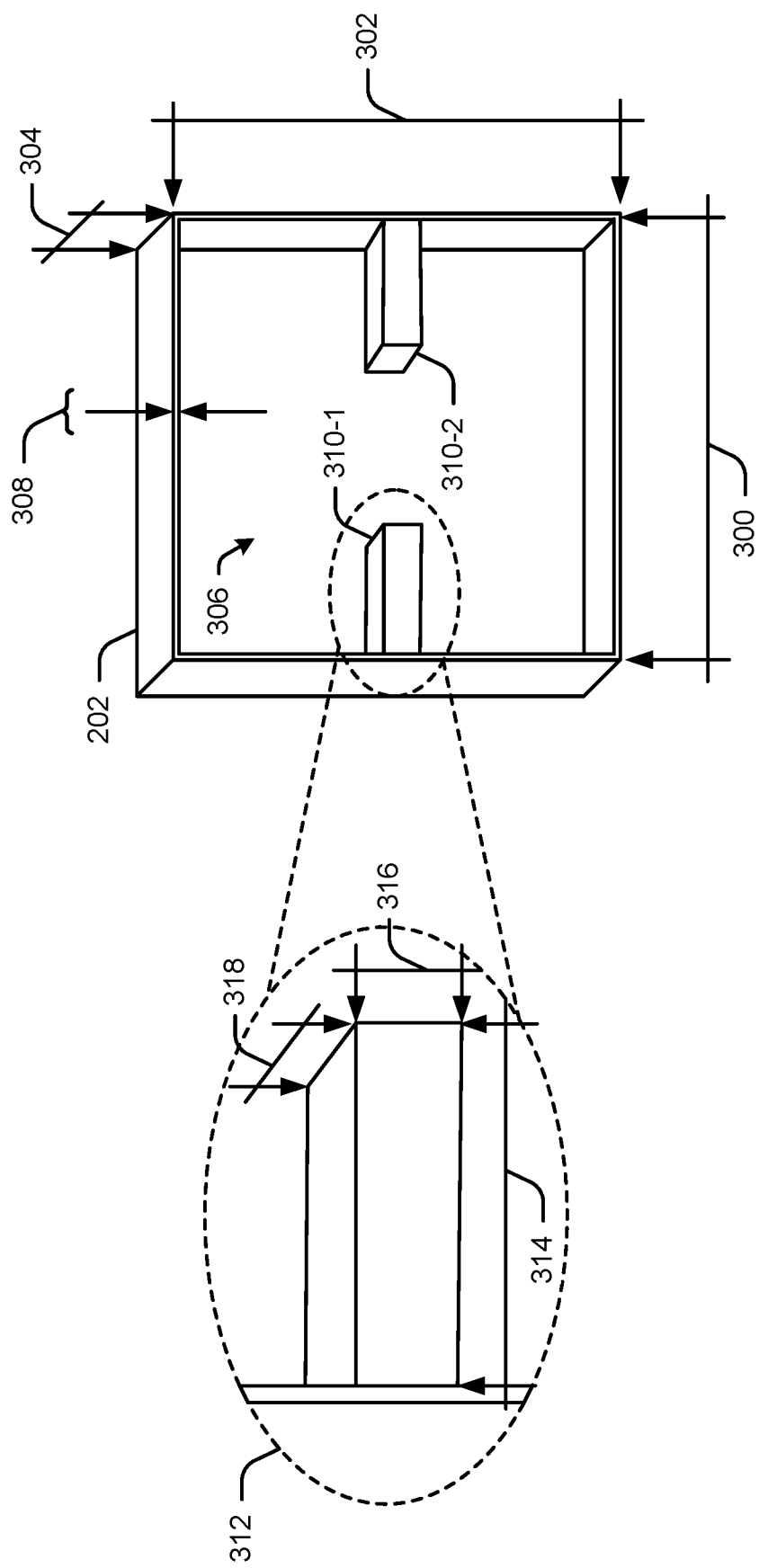
FIG. 3 illustrates an example bottom shielding structure in accordance with one or more implementations.

FIG. 3 illustrates a more detailed view of bottom shielding structure 202 of FIG. 2. In various scenarios, the example described with respect to FIG. 3 can be considered a continuation of one or more examples described with respect to FIGS. 1 and 2.

Bottom shielding structure 202 has a rectangular shape with a corresponding width 300, height 302, and depth 304, each of which represents an arbitrary value. Together, these dimensions form a structure that includes a cavity with a predetermined volume, generally indicated here as cavity 306. While these dimensions are described in the context of a rectangular shape, alternate or additional shapes can be utilized to form the bottom shielding structure without departing from the scope of the claimed subject matter. The volume of cavity 306 can be based on any suitable type of characteristic, such as a desired resonance frequency and/or bandwidth. In various implementations, the cavity size and/or volume is selected to prevent the cavity from resonating at an operating resonance frequency of the corresponding slot antenna included in antenna unit (e.g., the slot antenna that the cavity backs).

In FIG. 3, each side structure of bottom shielding structure 202 that extends outwardly to form and/or define cavity 306 has a thickness 308 that represents an arbitrary value. In example bottom shielding structure 202, each of the extended sides has a uniform thickness relative to one another. However, alternate or additional implementations can use varying thickness for the extending sides, where some of the extended sides have a larger or smaller thickness relative to the other extended sides. To illustrate, in one or more implementations, bottom shielding structure 202 has dimensions that fall within a range of 5 mm×5 mm×1 mm at the Ka band (e.g., 26-40 GHz).

Bottom shielding structure 202 also includes slab 310-1 and slab 310-2 that protrude towards the inside of cavity 306. Various implementations include slabs to modify a resonance frequency, such as by eliminating, dampening, and/or shifting a lossy resonance that can distort or cause loss in a frequency band of interest or a predefined frequency band within cavity 306. Accordingly, the inclusion of slab 310-1 and slab 310-2 help attenuate and/or suppress undesired frequencies within cavity 306 by disrupting and/or shielding out the undesired modes. In turn, this improves the propagation of the desired frequency at which the corresponding slot antenna resonates. While bottom shielding structure 202 includes two rectangular slabs in FIG. 3, a bottom shielding structure can include any other number of slabs in any other shape and/or size without departing from the scope of the claimed subject matter.

Image 312 magnifies slab 310-1 to illustrate various properties associated with the slab. While slab 310-1 and slab 310-2 are uniform in shape, it is to be appreciated that the slabs included in cavity 306 can have varying shapes and/or sizes from one another. Here, slab 310-1 has a rectangular shape with a corresponding width 314, height 316, and depth 318 that each represent arbitrary values. In various implementations, the shape, size, and/or dimensions of slab 310-1, as well as other slabs included in cavity 306, can be based upon a dampening property (e.g., suppress or shift undesired lossy resonances). To illustrate, in one or more implementations, slab 310-1 and/or slab 310-2 has dimensions that fall within a range of 1.0-2.0 millimeters (mm)×0.4-0.8 mm×0.5-1.5 mm. In at least one implementation, the slabs generally have the dimensions of 1.6 mm×0.6 mm×1 mm, where the phrase "generally" indicate that in real-world embodiments, the dimensions can deviate from these exact values (e.g., deviations described within the range as indicated above).

Figure 4:
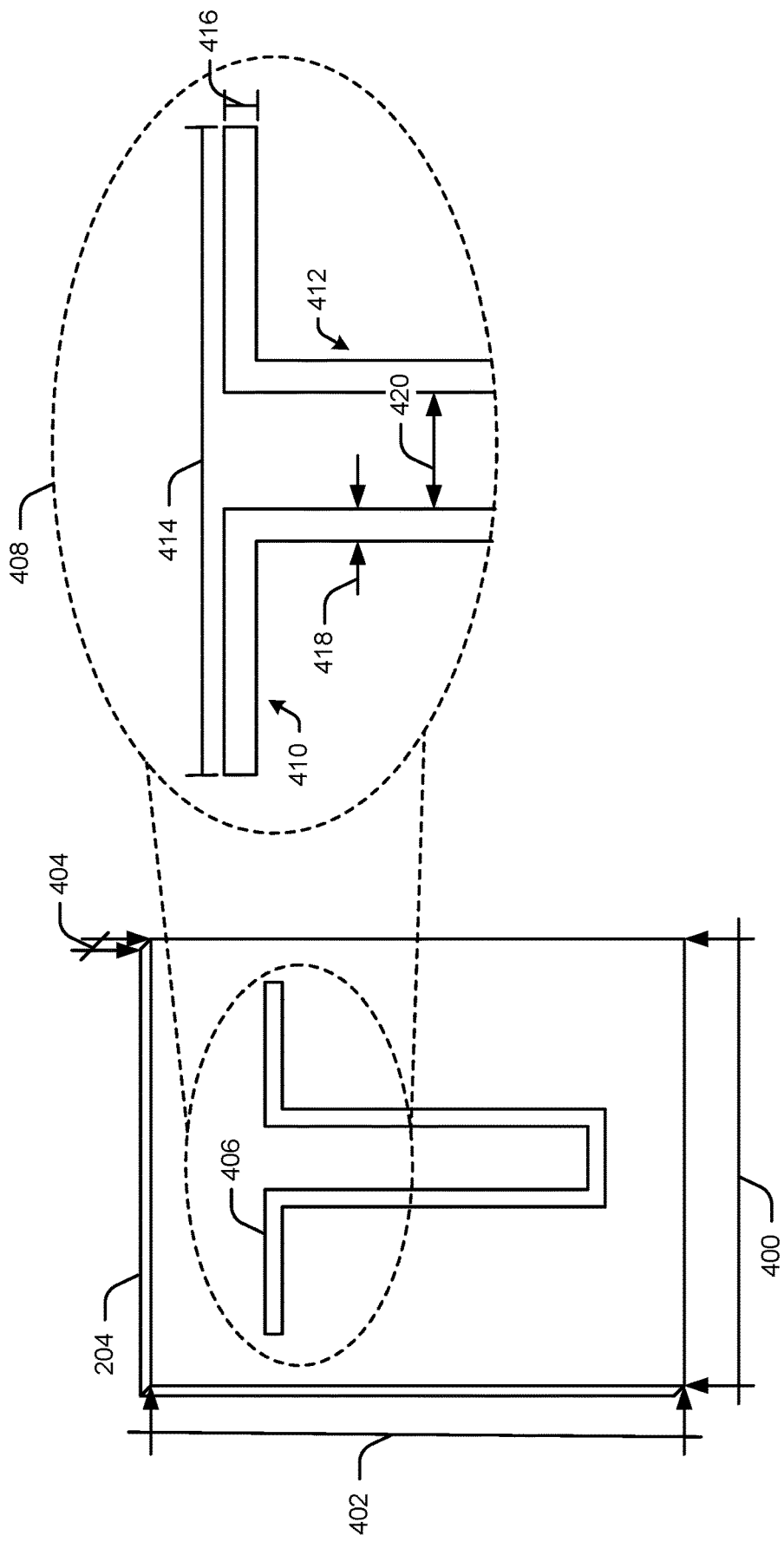
FIG. 4 illustrates an example coplanar waveguide direct-fed slot antenna in accordance with one or more implementations.

Now consider FIG. 4 that illustrates a more detailed view of slot antenna 204 of FIG. 2. In various scenarios, the example described with respect to FIG. 4 can be considered a continuation of one or more examples described with respect to FIGS. 1-3.

The metal plate used to construct slot antenna 204 follows the rectangular shape of bottom shielding structure 202. Here, the metal plate has a width 400, a height 402, and a depth 404, each of which represents an arbitrary value. To illustrate, in one or more implementations, the slot antenna and/or metal plate has dimensions that fall within a range of 4-6 mm×4-6 mm×0.01-0.04 mm. In at least one implementation, the slot antenna and/or metal plate generally has the dimensions of 5 mm×5 mm×0.02 mm, where the phrase "generally" indicates that in real-world embodiments, the dimensions can deviate from these exact values (e.g., deviations described within the range as indicated above). As further described herein, the metal plate can be formed from any suitable type of material, such as copper, coppery alloy, aluminum, iron, nickel, tin, steel, etc., where the type of material can be based upon various characteristics of the desired signals to be propagated (e.g., frequency, bandwidth, power, etc.). The metal plate includes an aperture 406 that, when excited with a signal feed, radiates electromagnetic waveforms. In one or more implementations, aperture 406 is excited with a single feed/single port, while in alternate or additional implementations, aperture 406 is excited with multiple signal feeds and/or multiple ports. In this example, aperture 406 has a shape corresponding to a coplanar waveguide, direct-fed, slot antenna such that the waveguide is used to guide the excitation signal to the portions of aperture 406 that radiate and/or propagate the signal outwardly.

The size, shape, and dimensions of aperture 406 can be based upon a desired radiation pattern, a desired resonant frequency, etc. To further illustrate, consider now image 408 includes a magnified portion of aperture 406. The aperture includes a pair of upper arms 410, illustrated here horizontally, which extend toward each other. Each upper arm joins with a corresponding downwardly extending leg, generally labeled here as legs 412. The legs are joined together at the bottom by a horizontally-extending bottom portion. Collectively, the upper arms 410 and legs 412 form what visually appears as a pair of mirrored "7's" joined together by the bottom portion. As can be seen, the span between the ends of the upper arms of the aperture corresponds to a length 414 while the arms each have a width 416. Various implementations base length 414 and/or width 416 on the wavelength of a desired resonant frequency and/or bandwidth. Similarly, the legs of the aperture have a gap 418 and are separated by distance 420. In various implementations, these values are based upon desired resonant frequencies, a desired impedance, desired transmission bandwidth, etc. To illustrate, in one or more implementations, aperture 406 has dimensions that fall within a range of 4 mm×0.4 mm.

Figure 5:
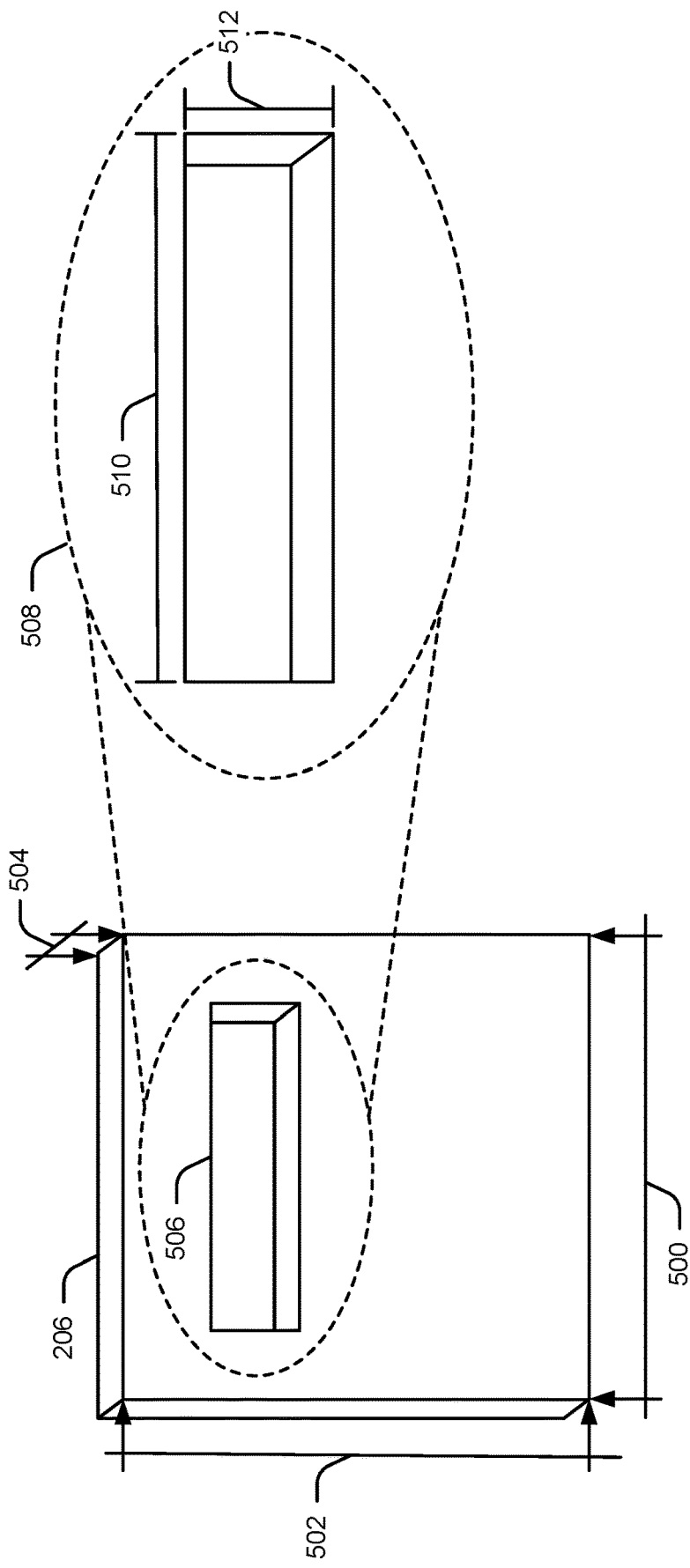
FIG. 5 illustrates an example top shielding structure in accordance with one or more implementations.

Continuing on, consider now FIG. 5 that illustrates a more detailed view of top shielding structure 206 of FIG. 2. In various scenarios, the example described with respect to FIG. 5 can be considered a continuation of one or more examples described with respect to FIGS. 1-4.

Top shielding structure 206 follows the rectangular shape of bottom shielding structure 202 and slot antenna 204 of FIG. 2. Accordingly, top shielding structure 206 has a width 500, a height 502, and a depth 504 that each represent an arbitrary value. In one or more implementations, top shielding structure 206 has dimensions that fall within a range of 5 mm×5 mm×0.7 mm. Various implementations construct top shielding structure 206 using metal plate, such as a copper plate, an aluminum plate, an iron plate, a nickel plate, a tin plate, etc. Top shielding structure 206 also includes an aperture window 506, in this case rectangular in shape, that provides an opening for signals radiated by slot antenna 204 to exit the corresponding antenna unit. In other words, aperture window 506 allows signals from the slot antenna to propagate outwardly from the antenna unit, while the solid structure around aperture window 506 shield the surrounding area from the signals. Accordingly, various implementations overlay aperture window 506 over portions of the slot antenna that radiate to align the radiating signals with the opening.

The size, shape, and dimensions of aperture window 506 can be based upon any suitable type of characteristic, such as the slot of the CPW direct-fed slot antenna 204 of FIGS. 2 and 4, the radiation pattern, the radiation efficiency, etc. In this example, aperture window 506's rectangular shape generally follows the shape of the upper arms of aperture 406 of slot of the CPW direct-fed slot antenna 204 of FIGS. 2 and 4. Image 508 constitutes an enlarged aperture window 506 to illustrate various properties of the aperture, such as length 510 and width 512, each of which represent arbitrary values. In one or more implementations, aperture window 506 has dimensions that fall within a range of 4 mm×0.8 mm.

When combined together, bottom shielding structure 202, slot antenna 204, and top shielding structure 206 of FIG. 2 form a multi-layered antenna unit that shields a surrounding area from signals radiated by the slot antenna, with the exception of signals that propagate outwardly from the aperture included in the top shielding structure. To further demonstrate, consider now FIG. 6 that illustrates the layering of these various components in accordance with one or more implementations. In various scenarios, the example described with respect to FIG. 6 can be considered a continuation of one or more examples described with respect to FIGS. 1-5.

Figure 6:
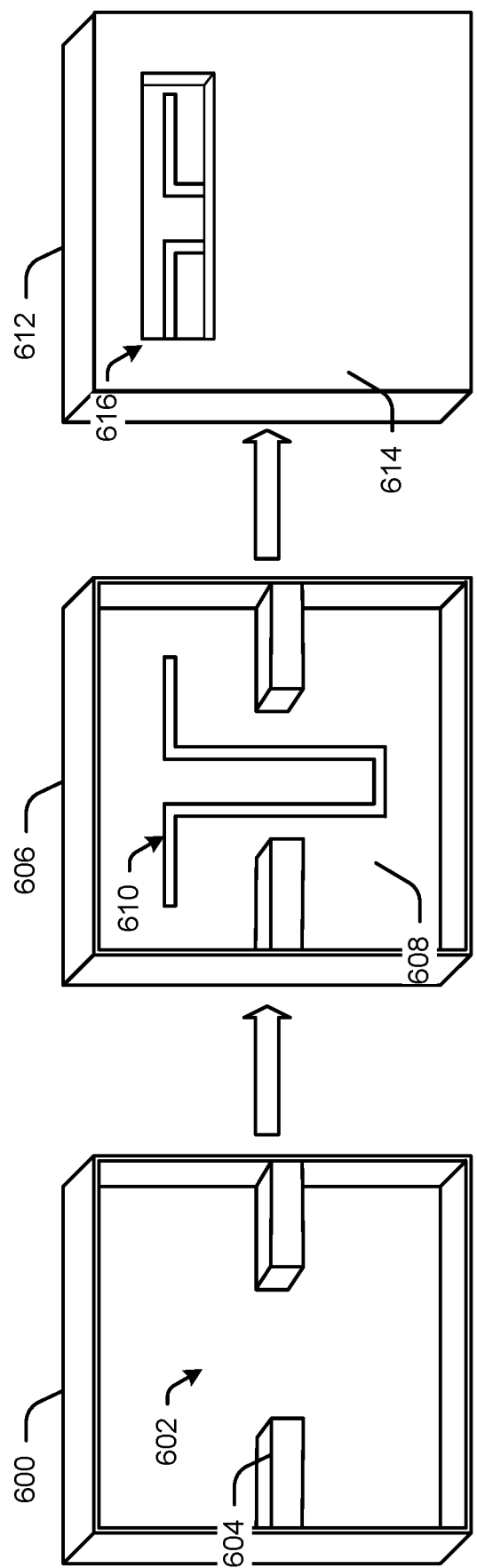
FIG. 6 illustrates a progression of layering various structures to form an antenna unit in accordance with one or more implementations.

The left side of FIG. 6 includes structure 600 that corresponds to bottom shielding structure 106 of FIG. 1 and/or bottom shielding structure 202 of FIG. 2. As can be seen, structure 600 includes a cavity 602 to provide unidirectional radiation, and slabs 604 to dampen, suppress, shift, and/or eliminate unwanted resonance from cavity 602. In implementations, slabs 604 can be formed using metal.

Moving to the middle of FIG. 6, structure 606 includes slot antenna 608 that has been layered on top of and/or into cavity 602 of structure 600. In FIG. 6, slot antenna 608 corresponds to a CPW direct-fed slot antenna that includes radiating arms 610 that correspond to portions of the slot antenna that are configured to propagate waveforms when a signal feed is applied to the antenna, but alternate or additional slot antenna types with differing sizes and/or shapes can be utilized. While not illustrated here, various implementations include a dielectric layer between slot antenna 608 and the inner bottom surface of the bottom shielding structure.

Moving to the right side of FIG. 6, structure 612 corresponds to a closed antenna unit that includes top shielding structure 614 overlaid on top of structure 606, where portions of the top shielding structure are sealed to portions of the bottom shielding structure. As further described herein, sealing top shielding structure 614 to structure 606 forms an antenna unit that provides comprehensive shielding to a surrounding area from signals radiated by slot antenna 608, with the exception of the signals propagated through aperture 616. The shielding provided by structure 600 attenuates backward and/or side signal radiation, while the top shielding structure 614 provides select shielding and select signal propagation. Accordingly, when the different layers are combined (e.g., the bottom shielding structure with a cavity, the slot antenna, and the top shielding structure), the antenna unit provides directional signal propagation at a desired location (e.g., aperture 616) and shielding in the surrounding locations. As one skilled in the art will appreciate, this allows the antenna unit to be placed closer to other types of electronic circuitry without negatively impacting their operation with undesired signal leaking. This also saves space in a corresponding computing device by using less setback space relative to other antennas. In turn, this allows the computing device to include other types of electronic circuitry in this space. In FIG. 6, the upper arms of the slot antenna are visible via aperture 616, but alternate or additional implementations include dielectric layers that visibly obscure the slot antenna from being seen through the aperture.

Figure 7:
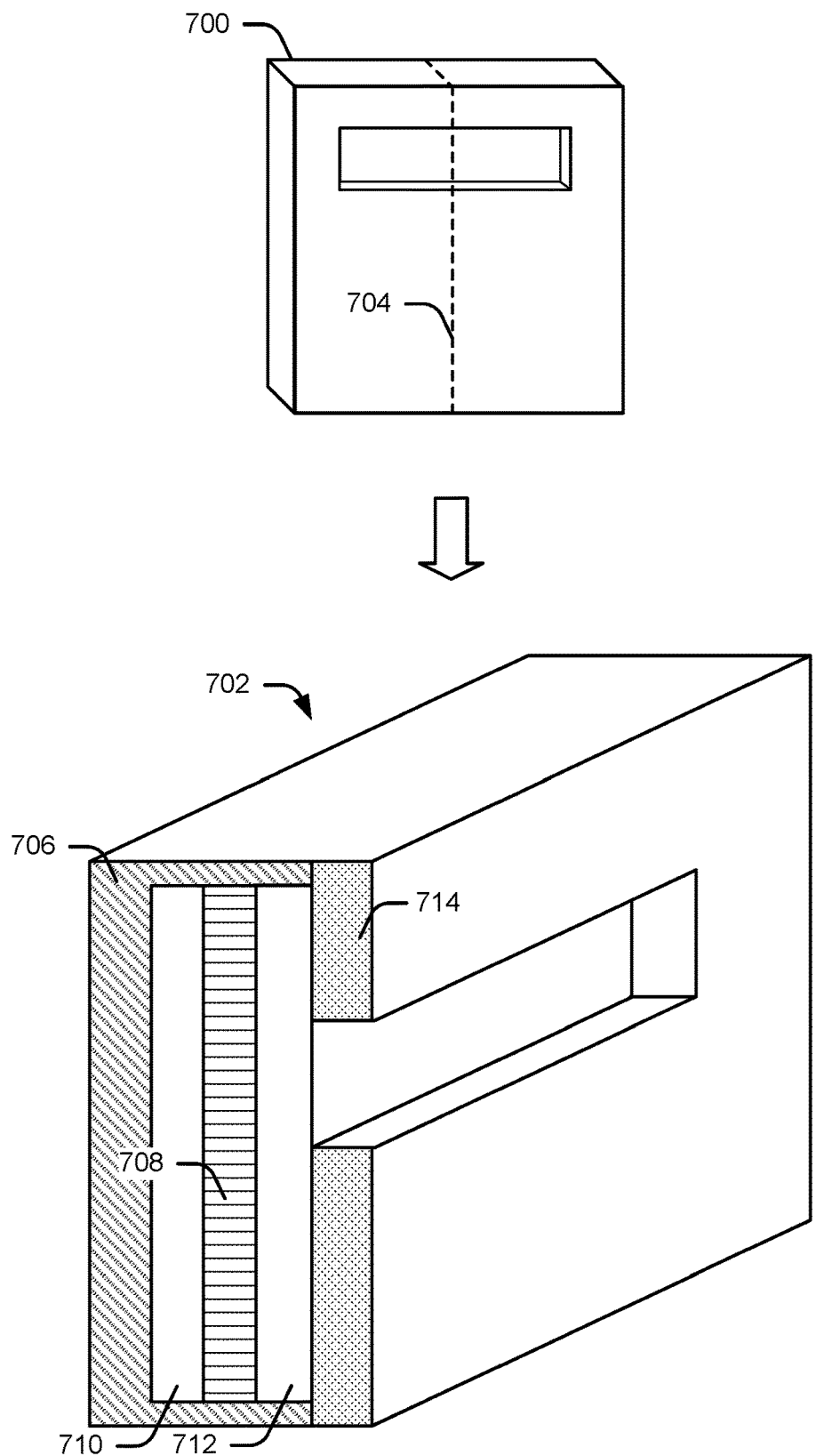
FIG. 7 illustrates a cross-sectional view of an antenna view in accordance with one or more implementations.

To demonstrate, consider FIG. 7 that illustrates an example cross-sectional view of an antenna unit in accordance with one or more implementations. In various scenarios, the example described with respect to FIG. 7 can be considered a continuation of one or more examples described with respect to FIGS. 1-6.

The upper portion of FIG. 7 includes an example antenna unit 700. In various implementations, antenna unit 700 is representative of antenna units 104 of FIG. 1, antenna unit 200 of FIG. 2, and/or structure 612 of FIG. 6. Various implementations layer a slot antenna between dielectric material(s).

To demonstrate, consider cross-section antenna unit 702 in the lower portion of FIG. 7 that represents a cross-section of antenna unit 700 taken from center line 704. As illustrated, the left-most layer of cross-section antenna unit 702 corresponds to a bottom shielding structure 706 that includes extended sides that create a cavity as further described herein. Similarly, layer 708 corresponds to a slot antenna that includes aperture(s) of any size and/or shape. Various implementations layer a dielectric, such as dielectric layer 710, in-between the bottom shielding structure and the slot antenna to add support to the structure. Any suitable type of dielectric can be utilized, such as plastic, porcelain, glass, ceramic, etc. Cross-section antenna unit 702 also includes dielectric layer 712 positioned between the slot antenna represented by layer 708 and top shielding structure 714. Dielectric layer 712 can be made of a same material as dielectric layer 710 and/or be made of different material. Accordingly, various implementations include dielectrics within the antenna unit.

In various implementations, an antenna unit can be combined with multiple antenna units to form an antenna array. This can be beneficial for high frequency communication systems, such as a 5G communication system. For instance, some 5G communication systems use additional spectrum that are considered high frequencies relative to other communication systems, such as a spectrum band corresponding to millimeter wave lengths and/or microwave wave lengths (e.g., generally 1-300 GHz). These high frequency rates, which also correspond to shorter wavelengths, pose several challenges to devices desiring to support a 5G communication system since these high frequency waveforms are prone to more free-space loss, atmospheric absorption, shorter transmission range for a given power, and scattering relative to lower frequencies.

While millimeter waveforms and/or microwave waveforms are more prone to degradation in transmission mediums, these higher frequencies advantageously have a smaller antenna length relative to lower frequencies. For instance, referring to a dipole antenna, since each pole has length of $$\frac{\lambda}{4}$$

for a resonant frequency corresponding to k, a smaller wavelength corresponds to a smaller antenna size. In turn, a smaller antenna sizes make incorporating the corresponding antenna into a computing device more feasible, especially in scenarios in which space is limited. While described with respect to a dipole antenna, other antenna generally demonstrate the same property of size relative to waveform length. Since millimeter waveform and/or microwave waveform antennas have a smaller size relative to antennas associated with lower frequencies, various implementations combat the transmission challenges associated with millimeter and/or microwave waveforms (e.g., free space loss, scattering, short transmission range) through the use of an antenna array. By using antenna arrays, and corresponding beam-formed signals, the various devices can combat some of the signal-loss challenges posed by these higher frequencies. However, a tradeoff exists in balancing the inclusion of antenna array in a device with the corresponding space available. Front-shielded CPW direct-fed cavity-backed slot antenna help address this tradeoff.

Figure 8:
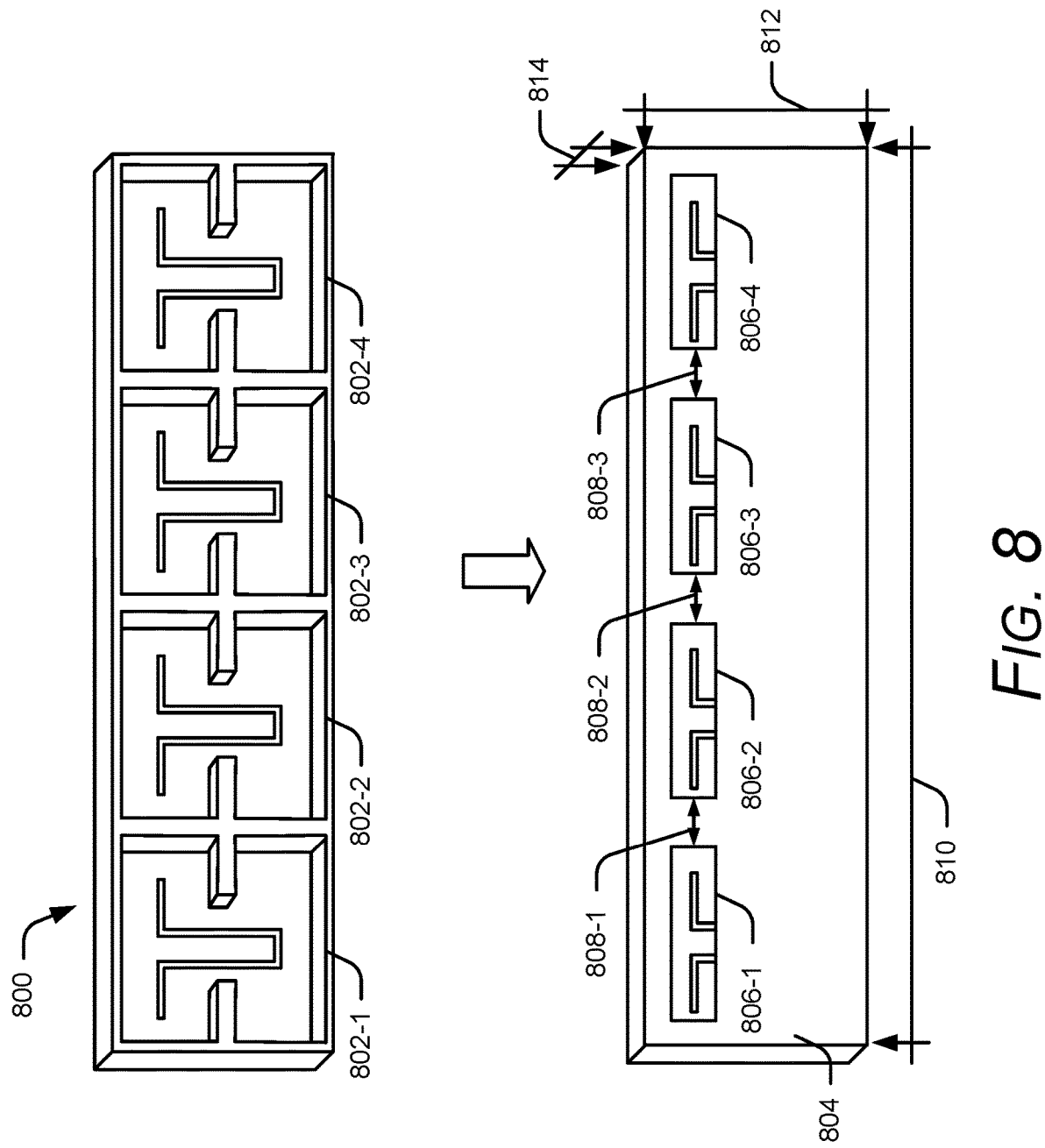
FIG. 8 illustrates an antenna array in accordance with one or more implementations.

To illustrate, consider now FIG. 8 that demonstrates an antenna array in accordance with one or more implementations. In various scenarios, the example described with respect to FIG. 8 can be considered a continuation of one or more examples described with respect to FIGS. 1-7.

The upper portion of FIG. 8 includes bottom array structure 800 that is a single structure partitioned into four bottom shielding structures for the respective antenna units: bottom shielding structure 802-1, bottom shielding structure 802-2, bottom shielding structure 802-3, and bottom shielding structure 802-4. In other words, bottom array structure 800 is a single structure that forms four respective bottom shielding structures and/or resonance slabs for each respective antenna unit rather than placing four separate bottom shielding structures (and respective resonance slabs) adjacent one another. Similar to that described with respect to FIG. 3, some implementations form the single structure using metal, examples of which are provided herein. While FIG. 8 illustrates a single structure that forms multiple bottom shielding structures for multiple antenna units, it is to be appreciated that alternate or additional implementations form antenna arrays utilizing independent antenna units (e.g., multiple bottom shielding structures instead of a single structure). The separate antenna units can be adjacent one another in a manner similar to that illustrated by bottom array structure 800 and/or can be positioned at varying locations from one another.

Moving to the lower portion of FIG. 8, a top array structure 804 has been placed over the antenna units of bottom array structure 800 to complete the formation of an antenna array that includes four antenna units. Accordingly, as further described here, the top array structure 804 seals to the edges of the extended sides of each respective antenna unit to provide comprehensive shielding around the array, with the exception of aperture windows that allow signal radiation to exit the respective antenna units. Thus, similar to the bottom shielding structure, a single structure is used to form top array structure 804, where the single structure includes four apertures: aperture window 806-1, aperture window 806-2, aperture window 806-3, and aperture window 806-4. Each respective aperture provides an opening for the respective signals radiated from the respective slot antenna to radiate outwardly, while the rest of top array structure 804 provides signal shielding and/or attenuation to the other surrounding area. Some implementations form the top shielding structure using a metal material, examples of which are provided herein.

Various implementations create a respective aperture for each respective antenna slot, rather than having a single aperture that spans top array structure 804. Thus, spacing 808-1 creates a distinct separation between aperture window 806-1 and aperture window 806-2, spacing 808-2 creates a distinct separation between aperture window 806-2 and aperture window 806-3, and spacing 808-3 creates a distinct separation between aperture window 806-3 and aperture window 806-4. This spacing prevents a single aperture that spans from aperture window 806-1 to aperture window 806-4 from adding undesired resonance and/or modifications to the radiation patterns emitted by the collective antenna units. Here, the antenna array has a rectangular shape with an arbitrary width 810, arbitrary height 812, and arbitrary depth 814. In one or more implementations, the antenna array has dimensions that fall within a range of 5 mm×5 mm×0.7 mm. The shielding provided by top array structure 804, as well as bottom array structure 800 provide comprehensive signal isolation to other electronic components from the electromagnetic radiation generated by the antenna array. The size and shielding provide flexibility as to where the antenna unit and/or antenna array can be positioned in a computing device.

Figure 9:
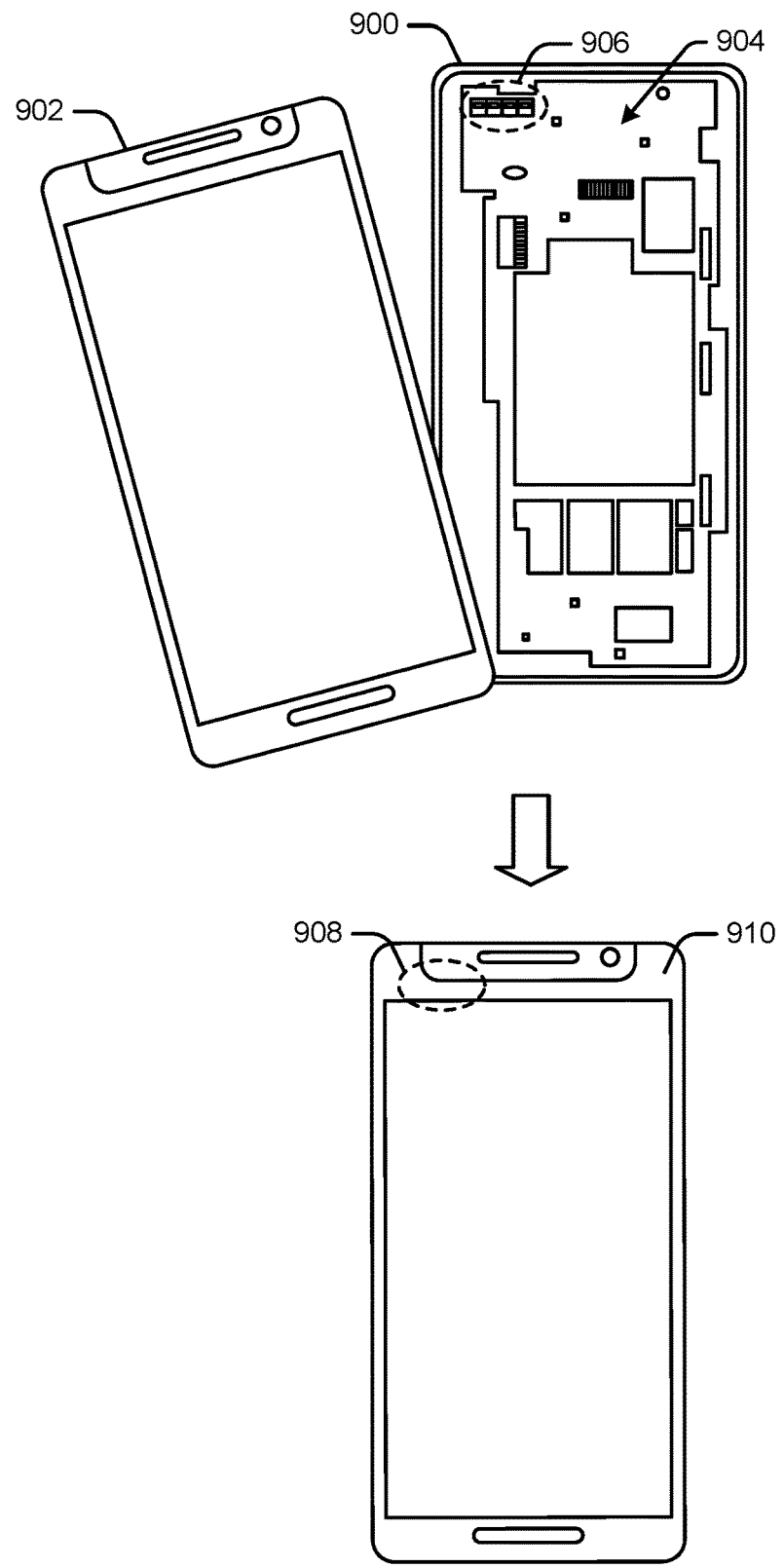
FIG. 9 illustrates an example placement of an antenna array in accordance with one or more implementations.

To demonstrate, consider now FIG. 9 that illustrates an example of utilizing an antenna array of front-shielded CPW direct-fed cavity-backed slot antennas in accordance with one or more implementations. In various scenarios, the example described with respect to FIG. 9 can be considered a continuation of one or more examples described with respect to FIGS. 1-8.

The upper portion of FIG. 9 includes an example computing device 900 with the corresponding display device 902 that has been partially removed to expose the inner components of computing device 900. In this example, computing device 900 includes a PCB 904 with various types of embedded and/or attached electronic components. PCB 904 also includes an antenna array 906 that corresponds to an array of front-shielded CPW direct-fed cavity-backed slot antenna, such as the one described with respect to FIG. 8. Because of unidirectional signal propagation and comprehensive shielding, antenna array 906 can be positioned closer to various different electronic components relative to unshielded antenna array.

Moving to the lower portion of FIG. 9, PCB 904 positions antenna array 906 under display device 902 at location 908. Various implementations place the antenna array in an inactive region 910 that generally represents portions of the display device that are devoid of electronic display circuitry, touch circuitry, and/or an active display region. Alternately or additionally, inactive region 910 corresponds to cutout regions of the display device. Thus, antenna array 906 is generally positioned in an inactive region as generally indicated by location 908. This allows the signals to radiate outwardly through these regions of the display device without disrupting the operation of the display device. This placement allows for the inclusion of an antenna array into a computing device without adding any protrusions to the device, such as protrusions that modify the rectangular shape of computing device 900. Accordingly, various implementations position an antenna array of front-shielded CPW direct-fed cavity-backed slot antenna directly under the display device without impacting operation of the display device and/or computing device form factor. In this example, the antenna array 906 provides forward signal radiation that propagates outward and away from display device 902. However, front-shielded CPW direct-fed cavity-backed slot antenna can alternately or additionally be positioned at other locations around computing device 900, such as at the back of the computing device to provide signal propagation outward and away from the back of the computing device. As another example, front-shielded CPW direct-fed cavity-backed slot antenna can be positioned at a side location of the computing device, such as at a metal band that encases the outer perimeter of the computing device. Thus, front-shielded CPW direct-fed cavity-backed slot antenna provide flexibility in where they can be positioned due to the corresponding shielding properties and directional signal propagation.

Figure 10:
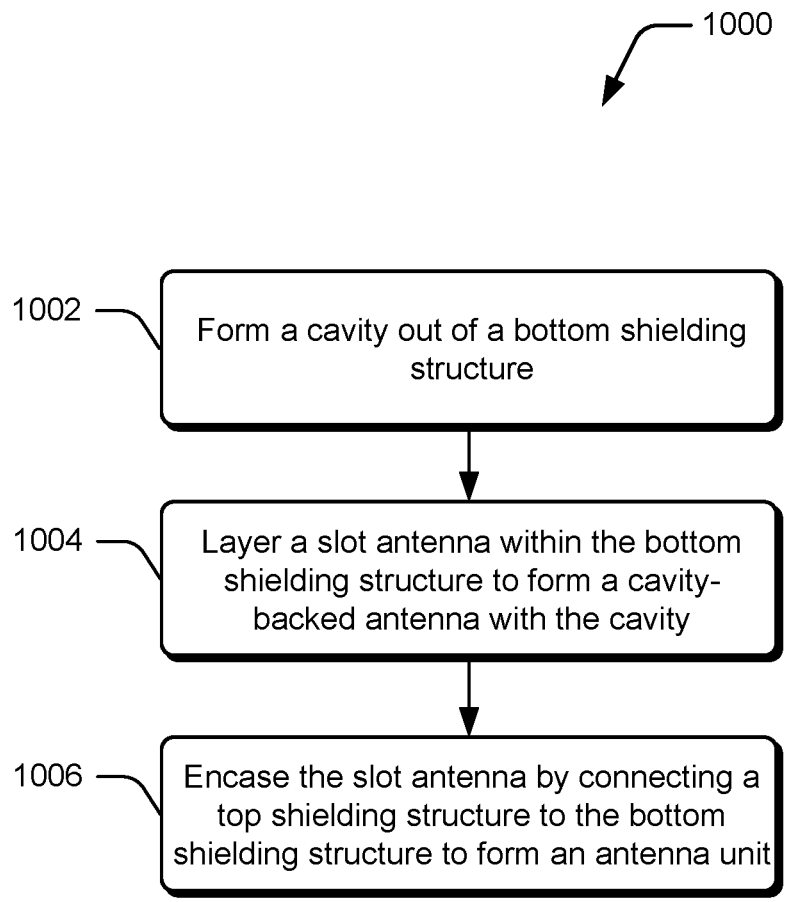
FIG. 10 illustrates an example flow diagram of utilizing an antenna unit for electromagnetic wave transmission in accordance with one or more implementations.

Now consider FIG. 10 that illustrates a method 1000 of transmitting a millimeter waveform and/or a microwave waveform using an antenna unit in accordance with one or more implementations. The method can be performed by any suitable combination of hardware, software, and/or firmware. In at least some implementations, aspects of the method can be implemented by one or more suitably configured hardware components and/or software modules, such as those described with respect to computing device 102 of FIG. 1. While the method described in FIG. 10 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1002, various implementations form a cavity out of a bottom shielding structure. One or more implementations form the cavity using a rectangular metal surface and extending the sides of the rectangular surface outward. While described in the context of a rectangular surface, other shapes can be utilized without departing from the scope of the claimed subject matter. In some scenarios, the cavity includes dampening slabs that modify a resonance frequency, such as by eliminating, shifting, and/or dampening a lossy resonance that can distort or cause loss in a desired, particular, and/or predefined frequency band. As further described herein, the cavity can have any volume, size, and/or shape.

One or more implementations layer a slot antenna within the bottom shielding structure to form a cavity-backed slot antenna with the cavity at 1004. Accordingly, various implementations back the slot antenna with the cavity formed out of the bottom shielding structure. Any suitable type of slot antenna can be utilized, such as a CPW direct-fed slot antenna. Various implementations layer a dual-port slot antenna within the bottom shielding structure as further described herein. Some implementations layer a dielectric between the slot antenna/dual-port slot antenna and the bottom surface of the bottom shielding structure to add support to structures.

At 1006, one or more implementations encase the slot antenna by connecting a top shielding structure to the bottom shielding structure to form an antenna unit, such as by sealing the top shielding structure to the bottom shielding structure. This includes top shielding structures with aperture windows positioned over portions of the slot antenna that are configured to radiate electromagnetic waveforms, such as waveforms within a frequency range from about between 600 Megahertz (MHz) to 72 Gigahertz (GHz), millimeter waveforms and/or microwave waveforms associated with 5G communication systems, etc. The phrase "about between" signifies that the frequency range can include real-world frequency deviations from the ideal and/or exact values, where the frequency deviations are still operable to maintain successful wireless communications. Similar to that described herein, various implementations layer a dielectric between the slot antenna/dual-port slot antenna and the top shielding structure.

Once assembled the antenna unit can be utilized to transmit millimeter waveforms and/or microwave waveforms as described above and below. Alternately or additionally, some implementations combine the antenna unit with other antenna units to form an antenna array that is capable of beam-forming. By forming an antenna unit by encasing a slot antenna with a bottom shielding structure and top shielding structure as described herein, various implementations create a cavity-backed slot antenna with front shielding that has unidirectional and/or one hemisphere signal radiation. This provides flexibility as to where the antenna unit can be placed relative to other electronic circuitry since the additional shielding and directional radiation protects signals that would otherwise cause degraded and/or inoperable performance. This also allows for compact layout designs on where the electronic circuitry is place, since setback regions become minimized and/or non-existent due to the additional shielding.

Having described front-shielded, CPW, direct-fed, cavity-backed slot antenna, now consider a discussion of single and dual-port slot antenna feeds in accordance with one or more implementations.

Single-port and Dual-port Slot Antenna Feeds

Various implementations utilize a single feed and/or single port to excite a slot antenna that is included in a front-shielded CPW direct-fed cavity-backed slot antenna. To demonstrate, consider FIG. 11 which illustrates some example single feed slot antennas in accordance with one or more implementations. In various scenarios, the examples described with respect to FIG. 11 can be considered a continuation of one or more examples described with respect to FIGS. 1-10.

Figure 11:
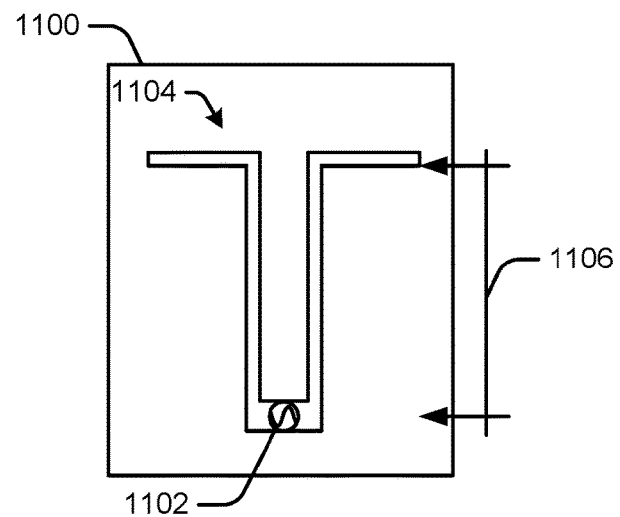
FIG. 11 illustrates example single port slot antennas in accordance with one or more implementations.
Figure 11:
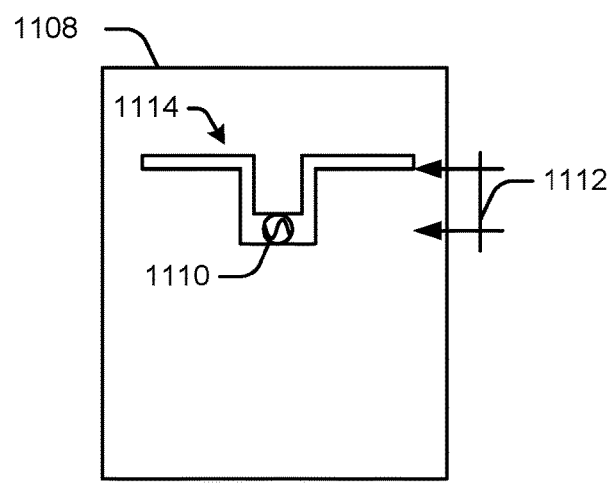

The upper portion of FIG. 11 includes slot antenna 1100 that is representative of a CPW direct-fed slot antenna in accordance with one or more implementations. Accordingly, in various scenarios, slot antenna 1100 is representative of slot antenna 108 of FIG. 1 and/or slot antenna 204 of FIG. 2. Thus, slot antenna 1100 can be utilized in an antenna unit as further described herein. In this example, slot antenna 1100 is excited via signal feed 1102 that is representative of a single feed and/or single port. A signal feed can be applied to the CPW transmission line of the corresponding slot antenna in any suitable manner, such as by electronically, magnetically, and/or capacitively coupling a micro-strip, a stripline, a coaxial cable, and so forth, to the slot antenna and/or wireless link components that generate the signals to transmit. Generally, a signal feed and/or signal port electrically connects signals generated via other circuitry, such as the electronic circuitry included on PCB 904 of FIG. 9, to the corresponding slots for subsequent propagation. In the upper portion of FIG. 11, signal feed 1102 is positioned away from the radiating arms 1104 of the slot antenna by an arbitrary distance 1106. In various implementations, the positioning of where a signal feed is applied to a slot antenna is based upon one or more characteristics associated with the system, such as an impedance associated with the slot antenna, a resonant frequency, etc.

Moving to the lower portion of FIG. 11, slot antenna 1108 represents a variation of a single feed antenna that is excited by signal feed 1110. In one or more implementations, slot antenna 1100 represents slot antenna 108 of FIG. 1 and/or slot antenna 204 of FIG. 2. Accordingly, slot antenna 1108 can be utilized in an antenna unit as further described herein.

The application of signal feed 1110 positions the feed an arbitrary distance 1112 from the radiating arms 1114 of the slot antenna, where distance 1112 sets signal feed 1110 closer to the radiating arms relative to signal feed 1102/distance 1106. Thus, the positioning of a signal feed relative to the radiating portions of a slot antenna can vary and/or be based on any suitable characteristic, examples of which are provided herein. While slot antenna 1100 and slot antenna 1108 illustrate a generally "U-shaped" or mirrored "7's" aperture, it is to be appreciated that any other size and/or shape can be utilized as further described herein.

Single port implementations provide a simplicity in cost and construction. For example, it is simpler to generate and route a single signal to a slot antenna relative to multiple signals since the single signal implementation utilizes less circuitry and space. However, it can be challenging to achieve a desired effective isotropic radiated power (EIRP) through the use of a single signal and single antenna. Multiple signals respectively excite multiple single port antenna and can improve EIRP. Accordingly, it can be desirable to apply multiple signal feeds and/or utilize multiple ports to excite a slot antenna to improve transmission power and/or signal strength. More signals, however, translate to more antenna and space, which can drive the development of antennas that utilize smaller footprints relative to other antenna that have the same transmission properties.

Figure 12A:
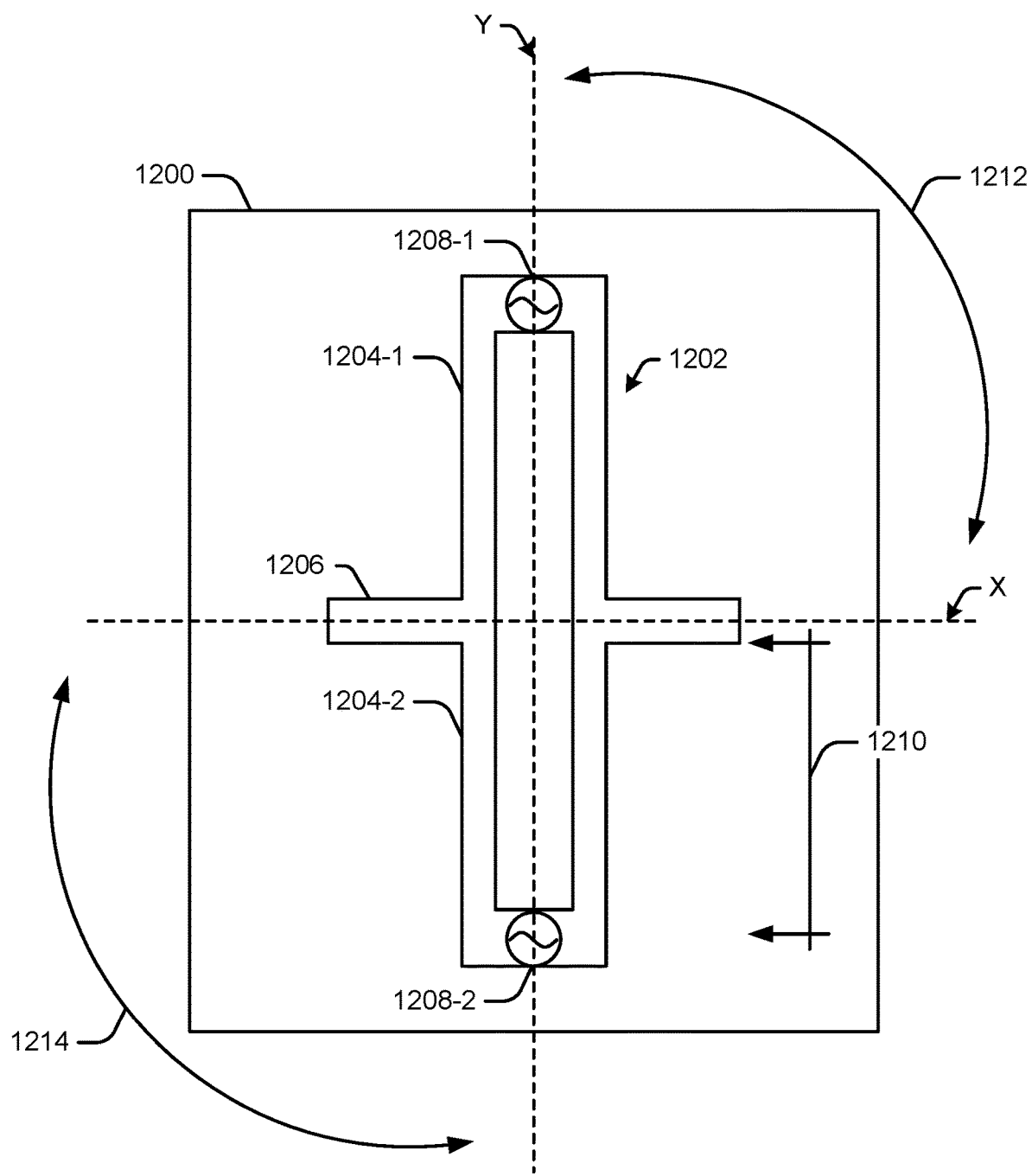
FIGS. 12a and 12b illustrate example differential drive dual-port slot antennas in accordance with one or more implementations.
Figure 12B:
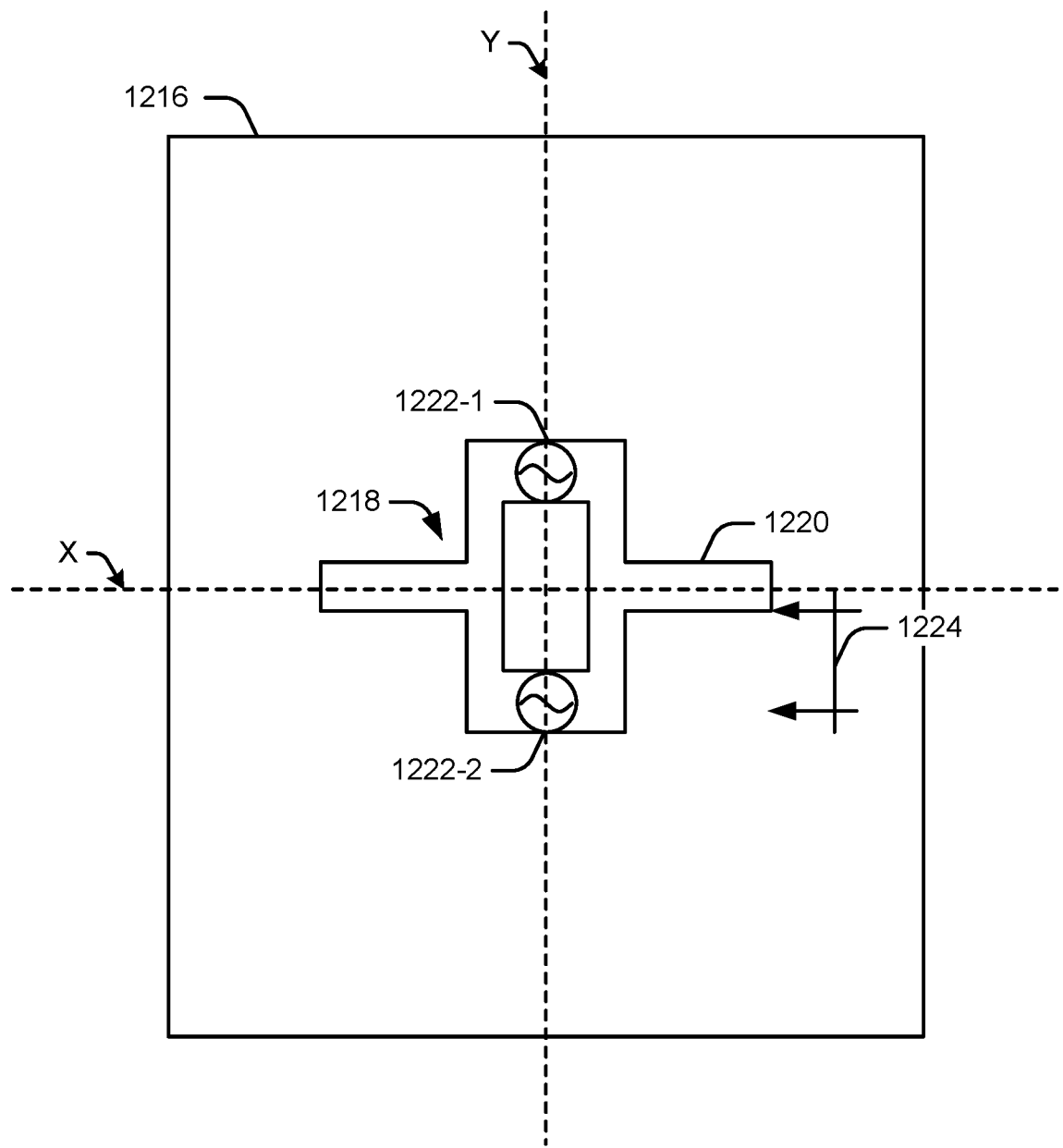

FIGS. 12a and 12b illustrate example differential drive dual-port slot antennas in accordance with one or more implementations. In various scenarios, the examples described with respect to FIGS. 12a and 12b can be considered continuations of one or more examples described with respect to FIGS. 1-11. FIG. 12a includes a differential drive dual-port slot antenna 1200 that is, in some scenarios, representative of slot antenna 108 of FIG. 1 and/or slot antenna 204 of FIG. 2. Accordingly, slot antenna 1200 can be utilized in an antenna unit as further described herein.

The differential drive dual-port slot antenna 1200 includes aperture 1202 that is configured to resonate electromagnetic waveforms utilizing multiple signal sources/ports/feeds. Here, aperture 1202 includes coplanar waveguide 1204-1 and coplanar waveguide 1204-2, each of which is associated with a respective signal feed, and radiating arms 1206, which are configured to radiate electromagnetic waveforms. Since the differential drive dual-port slot antenna 1200 is a dual-port slot antenna, coplanar waveguide 1204-1 corresponds to guiding waves associated with signal feed 1208-1 towards radiating arms 1206, and coplanar waveguide 1204-2 corresponds to guiding waves associated with signal feed 1208-2 towards radiating arms 1206. In this example, signal feed 1208-1 and signal feed 1208-2 are positioned away from the radiating arms, indicated here by arbitrary distance 1210. Similar to that described with respect to FIG. 11, the relative location of the signal feeds to the radiating arms can be based upon any suitable type of characteristic, examples of which are provided herein.

In various implementations, signal feed 1208-1 and signal feed 1208-2 are driven by differential signal sources. A differential signal source transmits complementary signals that convey information using differences between the two signals. Accordingly, in some implementations, signal feed 1208-1 represents a first complimentary signal in a differential signal source, and signal feed 1208-2 represents a second complementary signal of the differential signal source. In-phase signal sources are related signals that have a fixed phase shift and/or offset between one another, such as 90°, that together convey information about components of a modulated signal. One such example includes an angle modulated signal that can be decomposed into two amplitude-modulated sinusoidal signals offset by 90°. In such a scenario, signal feed 1208-1 represents a first component (e.g., the first amplitude-modulated signal), and signal feed 1208-2 represents the second component (e.g., the second amplitude modulated signal). Thus, dual-port slot antenna can be driven by in-phase sources and/or differential sources.

In various implementations, the geometric shape of aperture 1202 follows what can be consider as a bilateral symmetry shape type. Generally, a bilateral symmetry shape type corresponds to a geometric shape that has the property of being divided into portions by an axis, where each portion of the geometric shape is a mirror image of the other. To demonstrate, consider the differential drive dual-port slot antenna 1200 that is divided by the Y-axis (illustrated here by a dotted line) into a left-hand portion and a right-hand portion. The geometric shape of the left-hand portion of aperture 1202 has a symmetric relationship to the right-hand portion of aperture 1202 such that the two portions are mirror images and/or symmetrical around the Y-axis. Thus, various implementations form the aperture with a geometric shape that has bilateral symmetry. The differential drive dual-port slot antenna 1200 has the additional property of having bilateral symmetry around the X-axis as well (also illustrated here by a dotted line).

While aperture 1202 has bilateral symmetry around a single axis (e.g., the Y-axis or the X-axis), alternate or additional implementations generate apertures utilizing geometric shapes with symmetry around and/or defined by multiple axes. To further illustrate, consider again the Y-axis in combination with the X-axis. The intersection of these axes defines four distinct regions with 90° of separation from one another on a 2-dimensional (2D) plane. Since aperture 1202 extends along both the X-axis and the Y-axis, these axes bisect the aperture into four separate portions as well. Thus, the X-axis bisects aperture 1202 into an upper portion and a lower portion, which are then bisected by the Y-axis that partitions the aperture into four geometric portions and/or shapes (e.g., an upper left portion, an upper right portion, a lower left portion, and a lower right portion).

Various implementations characterize the shape of an aperture using symmetry based upon the intersection of multiple axes. To demonstrate, consider the shape of aperture 1202 that is resident in quadrant 1212. In this example, the shape of aperture 1202 resident in quadrant 1212 is inverted diagonally, which corresponds to a 180° rotation around the X-axis and a 180° rotation around the Y-axis.

This diagonal inversion forms the shape of aperture 1202 in diagonal quadrant 1214. This process repeats for the other diagonal quadrants to form the overall shape of aperture 1202. While described in the context of the X- and Y-axis quadrants that have 90° of separation, other axes with different angle separations can be utilized as well. For example, various implementations have apertures with inverse diagonal symmetry based on axes and/or intersections with 45° of separation, 30° of separation, etc. Thus, one or more implementations form an aperture using symmetric shapes, where the shapes are defined by the intersection of two axes, and the symmetry occurs across diagonal regions.

Moving to FIG. 12b, differential drive dual-port slot antenna 1216 represents a variation of the differential drive dual-port slot antenna 1200. Accordingly, in some implementations, the differential drive dual-port slot antenna 1216 represents slot antenna 108 of FIG. 1 and/or slot antenna 204 of FIG. 2, and can be utilized in an antenna unit as further described herein.

Similar to the differential drive dual-port slot antenna 1200, the differential drive dual-port slot antenna 1216 includes an aperture 1218 that has a geometric shape with bilateral symmetry around the Y-axis, denoted here with a dotted line. Aperture 1218 also has bilateral symmetry around the X-axis, also denoted here with a dotted line. The differential drive dual-port slot antenna 1216 represents an example dual-port slot antenna that positions the signal feeds closer to the radiating portions of the aperture (e.g., radiating arms 1220) relative to the signal feeds applied to the differential drive dual-port slot antenna 1200. This is further demonstrated in FIG. 12b where signal feed 1222-1 and signal feed 1222-2 are applied at an arbitrary distance 1224 from the radiating arms 1220, which is a shorter distance than arbitrary distance 1210. Accordingly, the positioning of dual-port signal feeds relative to the radiating portions of a slot antenna aperture can vary. Similar to that described with respect to FIG. 12a, the differential drive dual-port slot antenna 1216 can be driven by differential sources.

Figure 13:
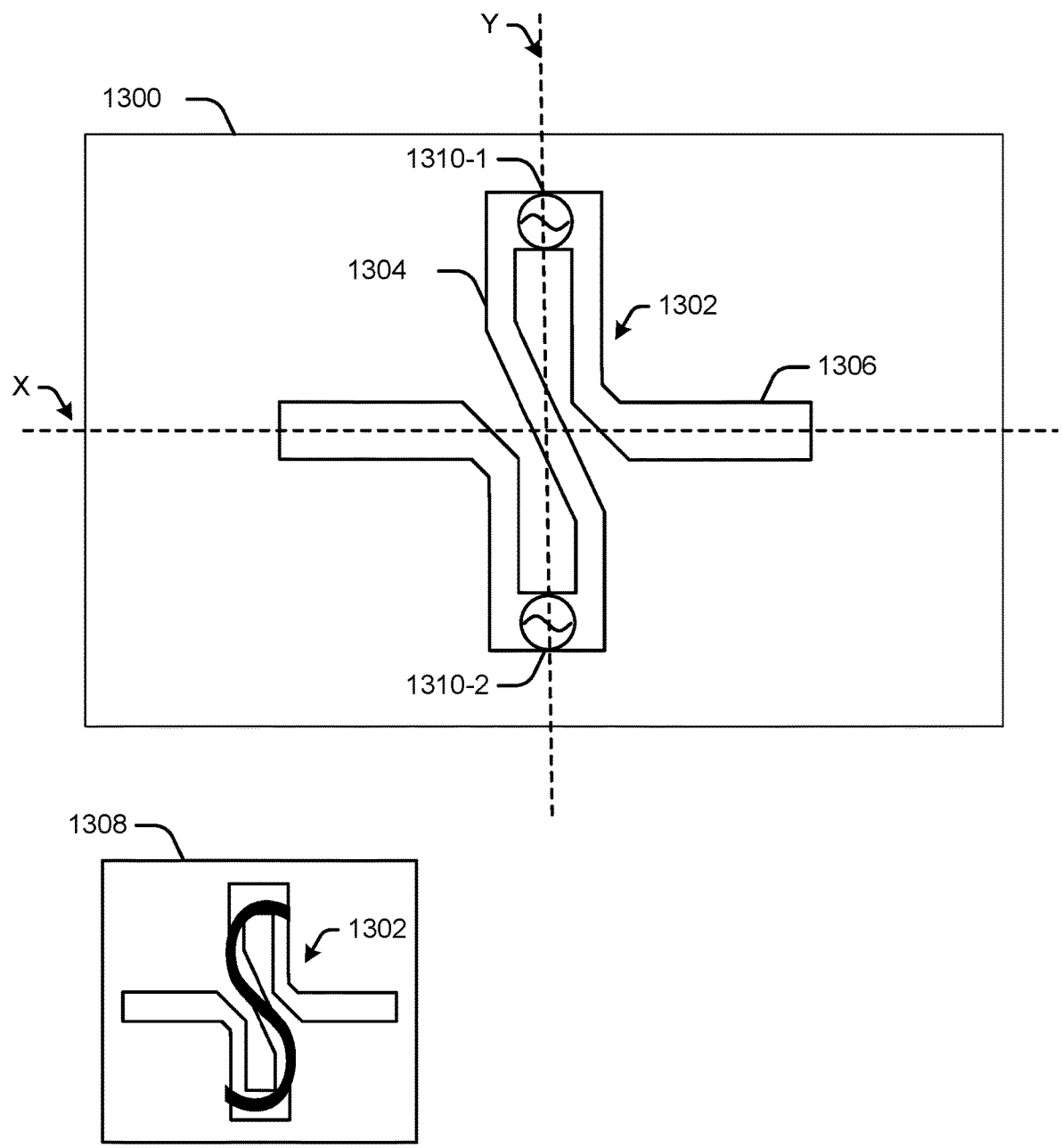
FIG. 13 illustrates an example differential drive dual-port slot antenna in accordance with one or more implementations.

Now consider FIG. 13 that illustrates an alternate configuration of a differential drive dual-port slot antenna in accordance with one or more implementations. In various scenarios, the example described with respect to FIG. 13 can be considered a continuation of one or more examples described with respect to FIGS. 1-12b. FIG. 13 includes a differential drive dual-port slot antenna 1300 that, in some implementations, represents slot antenna 108 of FIG. 1 and/or slot antenna 204 of FIG. 2. Accordingly, the differential drive dual-port slot antenna 1300 can be utilized in an antenna unit as further described herein.

The geometric shape of aperture 1302 in the differential drive dual-port slot antenna 1300 has a bilateral symmetry shape type around the Y-axis, denoted here via a dotted line. Here, the bilateral symmetry shape type corresponds to an inverse bilateral symmetry shape type, where the shapes of the symmetric portions divided by an axis are inverted from one another. Thus, in the context of FIG. 13, the Y-axis divides aperture 1302 into two portions, where the shape of aperture 1302 on the left-hand side of the Y-axis corresponds to an inverted symmetric (mirror) shape of aperture 1302 on the right-hand side of the Y-axis. Accordingly, aperture 1302 has an inverse bilateral symmetric shape type around the Y-axis. The same holds true regarding the inverted bilateral symmetric shape type around the X-axis. Alternately or additionally, aperture 1302 has inverted diagonal symmetry based upon the regions/quadrants defined by the intersection of the X-axis (also illustrated with a dotted line) with the Y-axis.

Aperture 1302 includes waveguides 1304 that generally follow the shape of an "S", and radiating arms 1306 which extend outward from the endpoints of the "S" shape. Here, the phrase "generally follows the shape" denotes an aperture whose shape follows the shape of the letter "S" within predetermined boundaries and/or within a predetermined deviation from the "S". Accordingly, the aperture has curves, angles, and/or changes in direction over its span that mimic an "S" within predetermined margins around the "S". Inset 1308 demonstrates an example of this by superimposing the letter "S" over aperture 1302. To drive differential drive dual-port slot antenna 1300, dual signal feeds are positioned between the radiating arms and waveguide(s). In FIG. 13, signal feed 1310-1 overlays on the waveguide at the upper curve of the "S", while signal feed 1310-2 overlays on the lower curve of the "S". Similar to that described with respect to FIGS. 12a and 12b, the positioning of dual-port signal feeds relative to the radiating portions of a slot antenna can vary, as can the type of signal sources driving the ports. This design can achieve certain phase shift compensation in compact manner relative to other designs. In implementations with a symmetric design, the dual-port antenna is driven by a differential signal.

Figure 14:
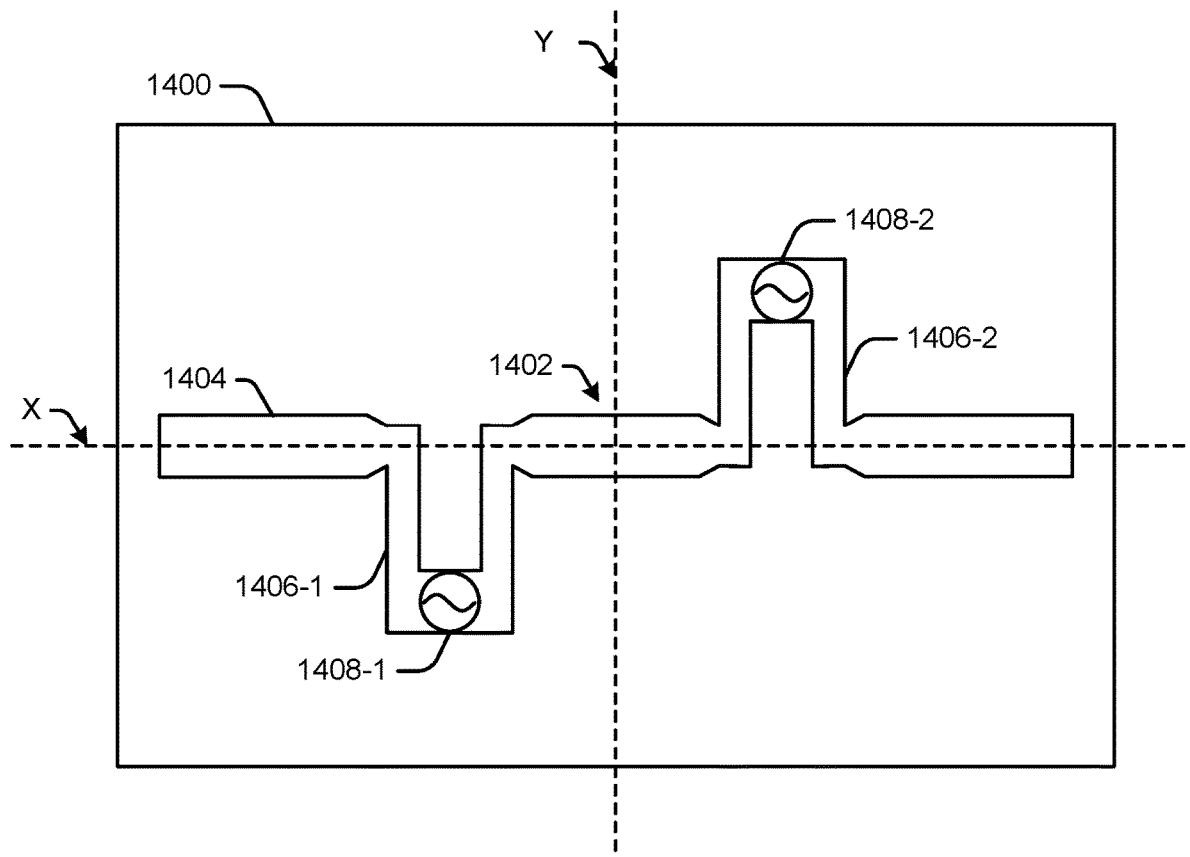
FIG. 14 illustrates an example differential drive dual-port slot antenna in accordance with one or more implementations.

Now consider FIG. 14 that includes an alternate example differential drive dual-port slot antenna 1400 that, in various scenarios, represents slot antenna 108 of FIG. 1 and/or slot antenna 204 of FIG. 2. Accordingly, the differential drive dual-port slot antenna 1400 can be utilized in an antenna unit as further described herein. In various implementations, the example described with respect to FIG. 14 can be considered a continuation of one or more examples described with respect to FIGS. 1-13.

The geometric shape of aperture 1402 in the differential drive dual-port slot antenna 1400 has an inverse bilateral symmetry shape type around the Y-axis, which is illustrated here via dotted lines. The Y-axis divides aperture 1402 into two portions, where the shape of aperture 1402 on the left-hand side of the Y-axis corresponds to an inverted symmetric (mirror) shape of aperture 1402 on the right-hand side of the Y-axis. Accordingly, aperture 1402 has an inverse bilateral symmetry. The same holds true for the inverse bilateral symmetry around the X-axis. Alternately or additionally, aperture 1402 has inverted diagonal symmetry based upon the regions/quadrants defined by the intersection of the X-axis (also illustrated with a dotted line) with the Y-axis.

Aperture 1402 includes radiating arms 1404 that are in-line with one another, and two separate waveguides: waveguide 1406-1 and waveguide 1406-2. Each waveguide guides waveforms originating from different ports to the radiating portions of the aperture. Thus, waveguide 1406-1 guides signals originating from signal feed 1408-1 to the radiating arms of aperture 1402 and waveguide 1406-2 guides signals originating from signal feed 1408-2 to the radiating arms. Similar to that described with respect to FIGS. 12a and 12b, the positioning of dual-port signal feeds relative to the radiating portions of the aperture can vary, as can the type of signal sources driving the ports.

Figure 15:
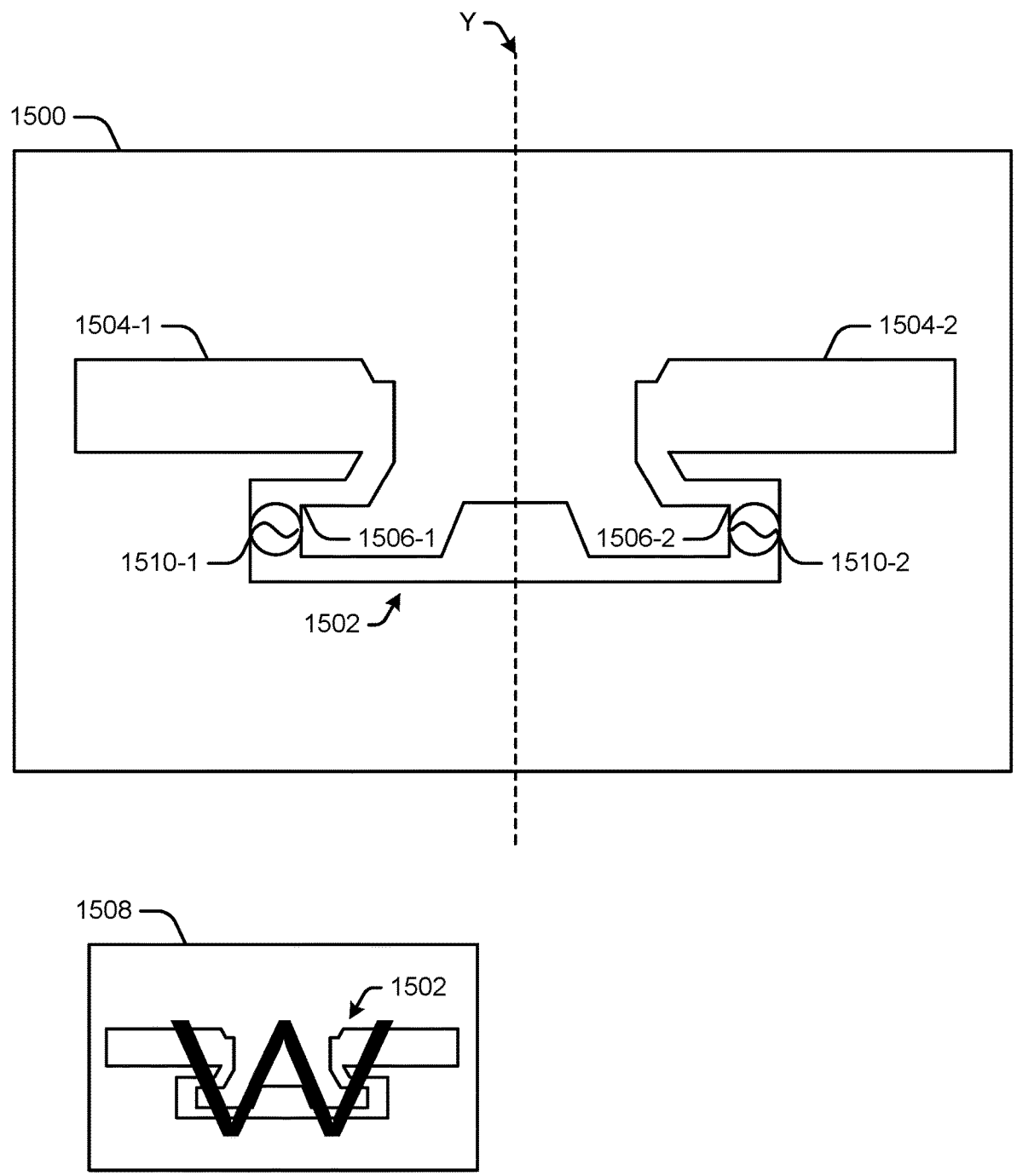
FIG. 15 illustrates an example differential drive dual-port slot antenna in accordance with one or more implementations.

Moving to FIG. 15, example differential drive dual-port slot antenna 1500 represents, in some implementations, slot antenna 108 of FIG. 1 and/or slot antenna 204 of FIG. 2. Accordingly, the differential drive dual-port slot antenna 1500 can be utilized in an antenna unit as further described herein. In various scenarios, the example described with respect to FIG. 15 can be considered a continuation of one or more examples described with respect to FIGS. 1-14.

The shape of aperture 1502 of the differential drive dual-port slot antenna 1500 has a geometric shape with bilateral symmetry around the Y-axis (denoted here with a dotted line). Aperture 1502 includes radiating arm 1504-1 and radiating arm 1504-2 that corresponds to portions of the aperture that radiate electromagnetic waveforms. Aperture 1502 also includes waveguide 1506-1 and waveguide 1506-2 that, together, generally follow the shape of the letter "W", where the radiating arms extend outward from the endpoints of the "W" shape. As further described herein the phrase "generally follows the shape" denotes an aperture whose shape follows the shape of the letter "W" within predetermined boundaries and/or within a predetermined deviation from the "W". Accordingly, the aperture has curves, angles, and/or changes in direction over its span that mimic a "W" within predetermined margins around the "W". Inset 1508 demonstrates an example of this by superimposing the letter "W" over aperture 1502.

Similar to other waveguides described herein, the waveguides guide waveforms originating from different signal ports to radiating portions of aperture 1502. Thus, in general terms, waveguide 1506-1 guides signals originating from signal feed 1510-1 to radiating arms 1504-1 and 1504-2, and waveguide 1506-2 guides signals originating from signal feed 1510-2 to radiating arms 1504-1 and 1504-2. Similar to that described with respect to FIGS. 12-14, the positioning of where the dual-port signal feeds are applied relative to the radiating portions of a slot antenna can vary, as can the type of signal sources driving the ports.

Figure 16:
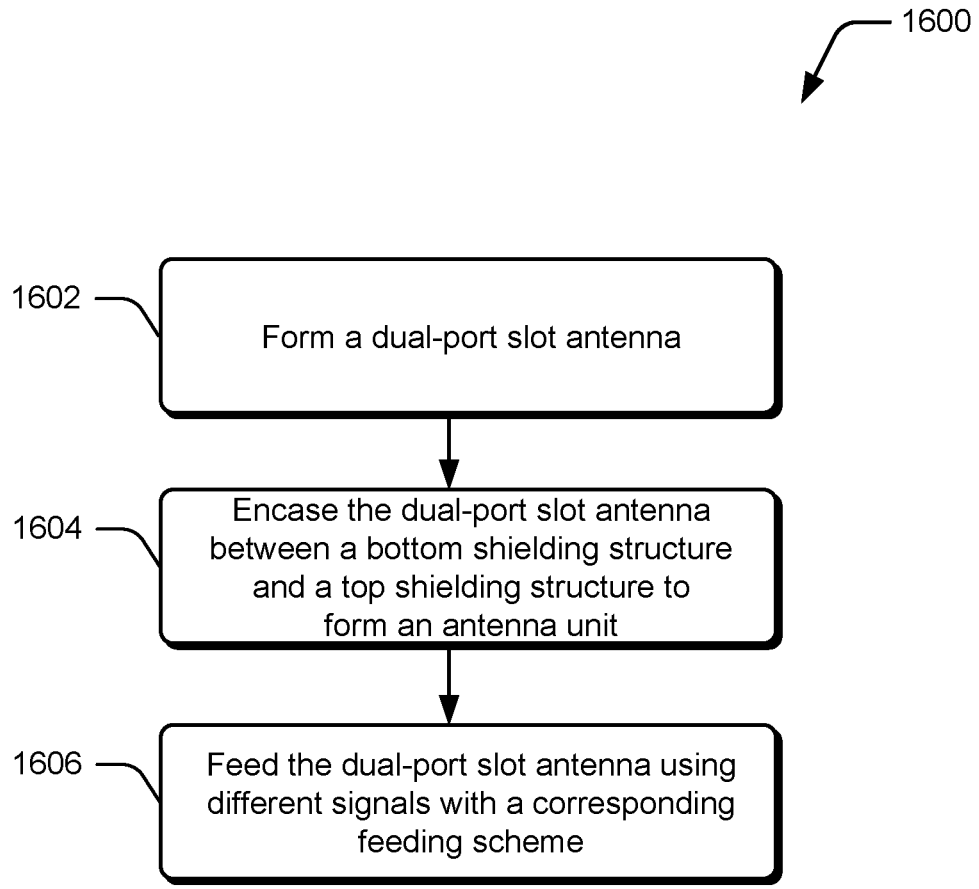
FIG. 16 illustrates a flow diagram of utilizing a differential drive dual-port slot antenna in an antenna unit in accordance with one or more implementations.

Now consider FIG. 16 that illustrates a method 1600 of transmitting millimeter waveforms and/or microwave waveforms using an antenna unit in accordance with one or more implementations. The method can be performed by any suitable combination of hardware, software, and/or firmware. In at least some implementations, aspects of the method can be implemented by one or more suitably configured hardware components and/or software modules, such as those described with respect to computing device 102 of FIG. 1 and/or the slot antennas described with respect to FIGS. 12a-15. While the method described in FIG. 16 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1602, one or more implementations form a dual-port slot antenna. While described in the context of a dual-port slot antenna, a slot antenna with any number of signal ports can be formed without departing from the scope of the claimed subject matter. This can include forming an aperture in a metal plate, where the aperture has a geometric shape with a bilateral symmetry shape type (e.g., bilateral symmetry, inverse bilateral symmetry), inverse diagonal symmetry, etc. Various implementations shape the aperture to radiate millimeter waveforms and/or microwave waveforms through the use of multiple signal feeds, such as signal feeds from differential signal sources, in-phase signal sources, etc.

Some implementations encase the dual-port slot antenna between a bottom shielding structure and a top shielding structure to form an antenna unit at 1604. As further described herein, the top shielding structure can include an aperture window that allows the millimeter waveforms and/or microwave waveforms radiated by the dual-port slot antenna to propagate out of the antenna. The shape of the aperture window can be based on any suitable characteristic, examples of which are provided herein. Various implementations layer the dual-port slot antenna between dielectric materials. At 1606, one or more implementations feed the dual-port slot antenna using differential signals with a corresponding feeding scheme, such as through the use of a stripline, a micro-strip, a coaxial cable, etc.

Once assembled, the dual-port antenna unit can be utilized to transmit millimeter waveforms and/or microwave waveforms as described above and below. Alternately or additionally, some implementations combine the dual-port antenna unit with other dual-port antenna units to form an antenna array that is capable of beam-forming. Using dual-port slot antenna allows for stronger signal propagation relative to signal-port slot antenna, such as waveforms within a frequency range from about between 600 Megahertz (MHz) to 72 Gigahertz (GHz), millimeter waveforms and/or microwave waveforms associated with 5G communication systems, etc. The phrase "about between" signifies that the frequency range can include real-world frequency deviations from the ideal and/or exact values, where the frequency deviations are still operable to maintain successful wireless communications. Accordingly, incorporating a dual-port slot antenna into an antenna unit provides strong signal propagation with comprehensive shielding to surrounding electronics. In turn, this provides flexibility on where the antenna unit can be positioned within computing device.

Having described single- and dual-port slot antennas, now consider a discussion of an example device that can be utilized in accordance with one or more implementations.

Example Device

Figure 17:
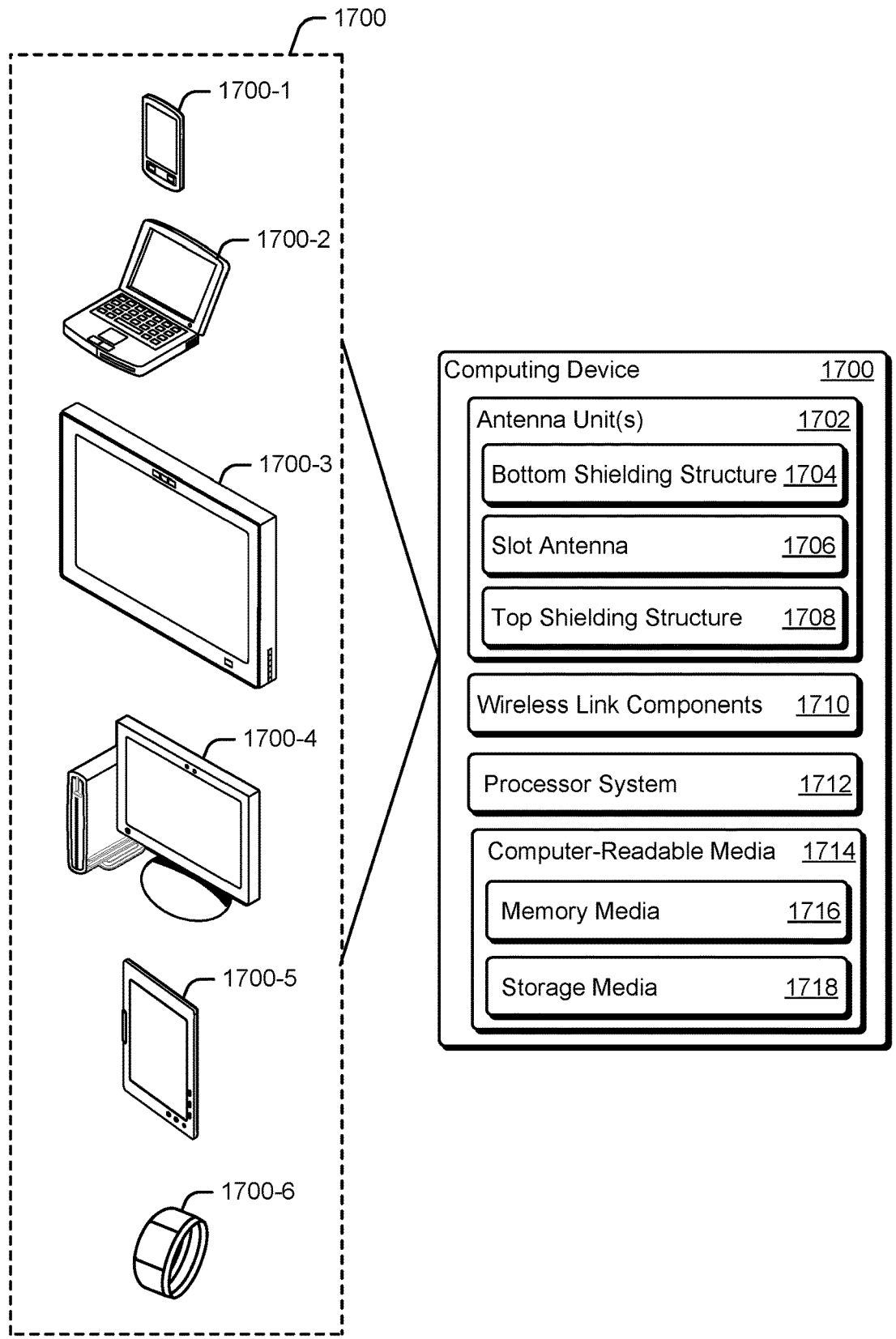
FIG. 17 is an illustration of an example computing device that can be used to employ front-shielded, coplanar waveguide direct-fed single port, or differential drive dual-port, slot antenna, in accordance with one or more implementations.

FIG. 17 illustrates various components of an example computing device 1700 that represents any suitable type of computing device that can be used to implement various aspects of front-shielded CPW direct-fed cavity-backed slot antenna as further described herein. In various scenarios, the example described with respect to FIG. 17 can be considered a continuation of one or more examples described with respect to FIGS. 1-16. FIG. 17 includes various non-limiting example devices including: mobile phone 1700-1, laptop 1700-2, smart television 1700-3, monitor 1700-4, tablet 1700-5, and smart watch 1700-6. Accordingly, computing device 1700 represents any mobile device, mobile phone, client device, wearable device, tablet, computing, communication, entertainment, gaming, media playback, and/or other type of electronic device that incorporates front-shielded CPW direct-fed cavity-backed slot antennas as further described herein. A wearable device may include any one or combination of a watch, armband, wristband, bracelet, glove or pair of gloves, glasses, jewelry items, clothing items, any type of footwear or headwear, and/or other types of wearables.

Computing device 1700 includes one or more antenna units 1702 that generally represent front-shielded cavity-backed slot antennas, such as a front-shielded CPW direct-fed cavity-backed slot antenna as further described herein. Accordingly, each antenna unit of antenna units 1702 includes a bottom shielding structure 1704, a slot antenna 1706, and a top shielding structure 1708.

Bottom shielding structure 1704 represents a housing structure that forms and/or includes a cavity that is devoid of electronic circuitry. Bottom shielding structure 1704 can be formed out of any suitable type of material, examples of which are provided herein. Various implementations base the thickness, size, and shape of the bottom shielding structure, as well as the cavity formed by the bottom shielding structure, on one or more characteristics, such as desired electromagnetic radiations patterns, bandwidths, etc. Accordingly, some implementations of bottom shielding structure 1704 include dampening structures to modify the resonance of the cavity, such as by eliminating, shifting, and/or suppressing lossy resonance.

Slot antenna 1706 represents a slot antenna placed on top of and/or within the cavity of bottom shielding structure 1704. In one or more implementations, the slot antenna 1706 connects and/or seals to the cavity to form a cavity-backed slot antenna that propagates signals in a unidirectional manner and/or in a single hemisphere. Various implementations configure the slot antenna as a CPW direct-feed slot antenna. This can include single port slot antennas and/or multiple port slot antennas, examples of which are provided herein. Various implementations layer dielectric material between slot antenna 1706 and bottom shielding structure 1704.

Top shielding structure 1708 represents a front shielding layer that connects and/or seals to bottom shielding structure 1704 to form a closed structure that provides signal shielding collectively around the antenna unit. In various implementations, top shielding structure 1708 includes an aperture window partially opens the closed structure to allow radiating waveforms to propagate outward from the antenna unit through the opening in a unidirectional manner. Similar to the bottom shielding structure, various implementations layer a dielectric between the slot antenna 1706 and the top shielding structure 1708.

Computing device 1700 also includes one or more wireless link component(s) 1710, which are used here to generally represent hardware, software, firmware, or any combination thereof, that is used to establish, maintain, and communicate over a wireless link. Wireless link components 1710 work in conjunction with antenna units 1702 to send, receive, encode, and decode corresponding messages communicated via the wireless signals. The wireless link components can be multipurpose (e.g., support multiple different types of wireless links) or can be single purpose. Computing device 1700 can include multiple types of wireless link components to support multiple wireless communication paths, or simply include a set of wireless link components configured for a single wireless communication path. In one or more implementations, wireless link components 1710 facilitate bi-directional wireless communications associated with millimeter waveform and/or microwave waveform communication systems, such as 5G communication systems.

Computing device 1700 also includes processor system 1712 that represents any of application processors, microprocessors, digital-signal processors, controllers, and the like, that processes computer-executable instructions to control operation of the computing device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits. Although not shown, computing device 1700 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Computing device 1700 also includes computer-readable media 1714, which includes memory media 1716 and storage media 1718. Applications and/or an operating system (not shown) embodied as computer-readable instructions on computer-readable media 1714 are executable by processor system 1712 to provide some, or all, of the functionalities described herein. For example, various embodiments can access an operating system module that provides high-level access to underlying hardware functionality by obscuring implementation details from a calling program, such as protocol messaging, display device configuration, register configuration, memory access, and so forth. Various implementations of computer-readable media include one or more memory devices that enable data storage, examples of which include random access memory (RAM), non-volatile memory (e.g., read-only memory (ROM), flash memory, EPROM, EEPROM, etc.), and a disk storage device. Thus, computer-readable media 1714 can be implemented at least in part as a physical device that stores information (e.g., digital or analog values) in storage media, which does not include propagating signals or waveforms. Various implementations can use any suitable types of media such as electronic, magnetic, optic, mechanical, quantum, atomic, and so on.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

The invention claimed is:

1. An antenna array, comprising:
a conductor plate encasing multiple dual-port, cavity backed antennas of the antenna array in respective separate cavities defined by partitions of a shielding structure connected to the conductor plate, the shielding structure configured as a first, single conductor and the conductor plate configured as a second, single conductor connected to the shielding structure;
multiple aperture windows configured in the conductor plate, each positioned over a respective one of the multiple dual-port, cavity-backed antennas to radiate waveforms by the multiple dual-port, cavity-backed antennas, an aperture window having a shape that extends along an axis that bisects the aperture window into a first bisected portion and a second bisected portion, the first bisected portion having a first geometry type, and the second bisected portion having a second geometry type that has a bilateral symmetry shape of the first geometry type; and
multiple signal feeds applied to the conductor plate for wireless signal transmission as the waveforms radiated by the multiple dual-port, cavity-backed antennas.

2. The antenna array as recited in claim 1, wherein the bilateral symmetry shape comprises an inverse bilateral symmetry shape.

3. The antenna array as recited in claim 1, wherein the shape of the aperture window resembles a letter "S".

4. The antenna array as recited in claim 1, wherein the shape of the aperture window resembles a letter "W".

5. The antenna array as recited in claim 1, wherein the shape of the aperture window is inversely diagonally symmetric.

6. The antenna array as recited in claim 1, wherein the multiple signal feeds comprise dual-port signal feeds.

7. The antenna array as recited in claim 1, wherein the shape of the aperture window is configured to radiate the waveforms within a frequency range for 5th Generation (5G) wireless signal communication.

8. The antenna array as recited in claim 1, wherein the shielding structure is a bottom shielding structure defining the respective separate cavities, and the conductor plate is a top shielding structure connected to the bottom shielding structure to encase the multiple dual-port, cavity backed antennas of the antenna array.

9. The antenna array as recited in claim 1, wherein the shielding structure defines the respective separate cavities, including one or more dampening structures that modify resonance frequencies within the respective separate cavities of the multiple dual-port, cavity-backed antennas.

10. The antenna array as recited in claim 1, wherein the shielding structure defines the respective separate cavities, including one or more dampening structures that shift a lossy resonance of a frequency within the respective separate cavities of the multiple dual-port, cavity-backed antennas.

11. The antenna array as recited in claim 1, wherein the aperture window configured in the conductor plate radiates the waveforms by at least one of the multiple dual-port, cavity-backed antennas within a frequency range from between 600 Megahertz (MHz) to 72 Gigahertz (GHz).

12. The antenna array as recited in claim 1, wherein the multiple signal feeds are each electronically coupled to the respective one of the multiple dual-port, cavity-backed antennas for the wireless signal transmission as the waveforms radiated by the antenna array.

13. The antenna array as recited in claim 1, wherein each of the respective separate cavities has a volume that prevents a cavity from resonating at a resonance frequency associated with the respective one of the multiple dual-port, cavity-backed antennas.

14. A wireless device, comprising:
  a wireless component configured to generate signals for wireless signal transmission;
  an antenna array configured with multiple dual-port, cavity-backed antennas, the antenna array including:
    a shielding structure configured as a first, single conductor with partitions forming separate cavities, each corresponding to one of the multiple dual-port, cavity-backed antennas located within one of the separate cavities;
    a conductor plate configured as a second, single conductor connected to the shielding structure to encase the multiple dual-port, cavity-backed antennas in respective ones of the separate cavities;
    multiple aperture windows configured in the conductor plate, each positioned over a respective one of the multiple dual-port, cavity-backed antennas, and configured to radiate waveforms by the multiple dual-port, cavity-backed antennas, the multiple aperture windows having a shape that extends along an axis that bisects an aperture window into a first bisected portion and a second bisected portion, the first bisected portion having a first geometry type, and the second bisected portion having a second geometry type that has a bilateral symmetry shape of the first geometry type; and
    multiple signal feeds electronically coupled from the wireless component to the antenna array for the wireless signal transmission as the waveforms radiated by the multiple dual-port, cavity-backed antennas.

15. The wireless device as recited in claim 14, wherein the shielding structure defines the separate cavities including one or more dampening structures that modify resonance frequencies within a separate cavity of a respective one of the multiple dual-port, cavity-backed antennas.

16. The wireless device as recited in claim 14, wherein the bilateral symmetry shape comprises an inverse bilateral symmetry shape.

17. The wireless device as recited in claim 14, wherein the shape of each of the multiple aperture windows resembles a letter "S".

18. The wireless device as recited in claim 14, wherein the shape of each of the multiple aperture windows resembles a letter "W".

19. The wireless device as recited in claim 14, wherein the shape of each of the multiple aperture windows is inversely diagonally symmetric.

20. The wireless device as recited in claim 14, wherein the shielding structure defines the separate cavities including one or more dampening structures that shift a lossy resonance of a frequency within a separate cavity of a respective one of the multiple dual-port, cavity-backed antennas.

* * * * *